US011972085B2

United States Patent
Van Ostrand et al.

(10) Patent No.: US 11,972,085 B2
(45) Date of Patent: *Apr. 30, 2024

(54) MULTI-CONDUCTOR TOUCH SYSTEM

(71) Applicant: SIGMASENSE, LLC., Wilmington, DE (US)

(72) Inventors: Daniel Keith Van Ostrand, Leander, TX (US); Patrick Troy Gray, Cedar Park, TX (US)

(73) Assignee: SIGMASENSE, Austin, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/828,354

(22) Filed: May 31, 2022

(65) Prior Publication Data

US 2022/0291765 A1  Sep. 15, 2022

Related U.S. Application Data

(63) Continuation of application No. 16/671,334, filed on Nov. 1, 2019, now Pat. No. 11,372,510.

(Continued)

(51) Int. Cl.
 *G06F 3/045* (2006.01)
 *G06F 3/041* (2006.01)
 *G06F 3/044* (2006.01)

(52) U.S. Cl.
 CPC ............ *G06F 3/045* (2013.01); *G06F 3/0416* (2013.01); *G06F 3/044* (2013.01)

(58) Field of Classification Search
 CPC ........ G06F 3/045; G06F 3/0416; G06F 3/044; G06F 3/0446

(Continued)

(56) References Cited

U.S. PATENT DOCUMENTS 5,437,178 A   8/1995 Esin et al.
6,218,972 B1  4/2001 Groshong
(Continued)

FOREIGN PATENT DOCUMENTS

CN   103995626 A   8/2014
CN   104182105 A   12/2014
(Continued)

OTHER PUBLICATIONS

Baker; How delta-sigma ADCs work, Part 1; Analog Applications Journal; Oct. 1, 2011; 6 pgs.
(Continued)

*Primary Examiner* — Chineyere D Wills-Burns
(74) *Attorney, Agent, or Firm* — Garlick & Markison; Timothy W. Markison; Shayne X. Short

(57) ABSTRACT

A touchscreen display includes one or more conductive layers that is implemented for a touch sensor and a common portion. The touch screen display may include as few as one conductive layer that is partitioned for both the touch sensor and the common portion in some examples. A first conductor of the touch sensor is composed of first segments(s) that are electrically connected, and a second conductor of the touch sensor is composed of a second segments(s) that are electrically connected. Also, the common portion includes a third conductor. Drive-sense circuits (DSCs) are respectively implemented to service the conductors and to generate digital signals representative of electrical characteristics of signals provided to those conductors. Processing module(s) is/are configured to execute operational instructions to process the digital signals to facilitate operation of the touchscreen display including to detect presence, interaction, and/or gestures, etc. of a user with the touchscreen display.

20 Claims, 28 Drawing Sheets

Related U.S. Application Data

(60) Provisional application No. 62/755,152, filed on Nov. 2, 2018.

(58) Field of Classification Search
USPC .......................................................... 345/173
See application file for complete search history.

(56) References Cited

U.S. PATENT DOCUMENTS

| | | | |
|---|---|---|---|
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,970,537 | B1 | 3/2015 | Shepelev |
| 8,982,097 | B1 | 3/2015 | Kuzo et al. |
| 9,081,437 | B2 | 7/2015 | Oda |
| 9,201,547 | B2 | 12/2015 | Elias |
| 10,007,335 | B2 | 6/2018 | Lee |
| 11,372,510 | B2* | 6/2022 | Van Ostrand ............ G06F 3/045 |
| 2003/0052657 | A1* | 3/2003 | Koernle .................... G05F 3/18 |
| | | | 323/282 |
| 2005/0235758 | A1* | 10/2005 | Kowal ................... G01F 15/06 |
| | | | 73/861.29 |
| 2007/0139369 | A1* | 6/2007 | Kao ........................... G06F 3/14 |
| | | | 345/156 |
| 2011/0063154 | A1 | 3/2011 | Hotelling et al. |
| 2011/0074705 | A1* | 3/2011 | Yousefpor ............ G06F 3/0412 |
| | | | 445/24 |
| 2011/0149375 | A1* | 6/2011 | Kothari .................. G02B 26/02 |
| | | | 445/24 |
| 2011/0298745 | A1* | 12/2011 | Souchkov ............. G06F 3/0446 |
| | | | 345/174 |
| 2012/0268422 | A1 | 10/2012 | Hirakawa |
| 2012/0278031 | A1 | 11/2012 | Oda |
| 2013/0265242 | A1* | 10/2013 | Richards ............... G06F 3/0446 |
| | | | 345/173 |
| 2013/0278447 | A1 | 10/2013 | Kremin |
| 2013/0335342 | A1 | 12/2013 | Kim |
| 2014/0327644 | A1* | 11/2014 | Mohindra ............... G06F 3/044 |
| | | | 345/174 |
| 2015/0091847 | A1 | 4/2015 | Chang |
| 2015/0227229 | A1* | 8/2015 | Schwartz .............. G06F 3/0446 |
| | | | 345/174 |
| 2015/0268778 | A1 | 9/2015 | Okamura |
| 2015/0346889 | A1* | 12/2015 | Chen ................... G06F 3/04166 |
| | | | 345/174 |
| 2016/0004346 | A1* | 1/2016 | Zhao .................... G06F 3/0443 |
| | | | 345/174 |
| 2016/0188049 | A1* | 6/2016 | Yang ................... G06F 3/04166 |
| | | | 345/174 |
| 2016/0291725 | A1 | 10/2016 | Zhai |
| 2017/0242502 | A1* | 8/2017 | Gray ................... G06F 3/04162 |
| 2017/0242534 | A1* | 8/2017 | Gray ................... G06F 3/041662 |
| 2018/0157354 | A1* | 6/2018 | Blondin ............... G06F 3/04164 |
| 2018/0275824 | A1* | 9/2018 | Li ........................... G06F 3/0412 |
| 2020/0103994 | A1* | 4/2020 | Vaze ....................... G06F 3/044 |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

European Patent Office; Extended European Search Report; Application No. 19853507.2; dated Jun. 13, 2023; 7 pgs.

* cited by examiner communication system 10 computing device 12 computing device 14

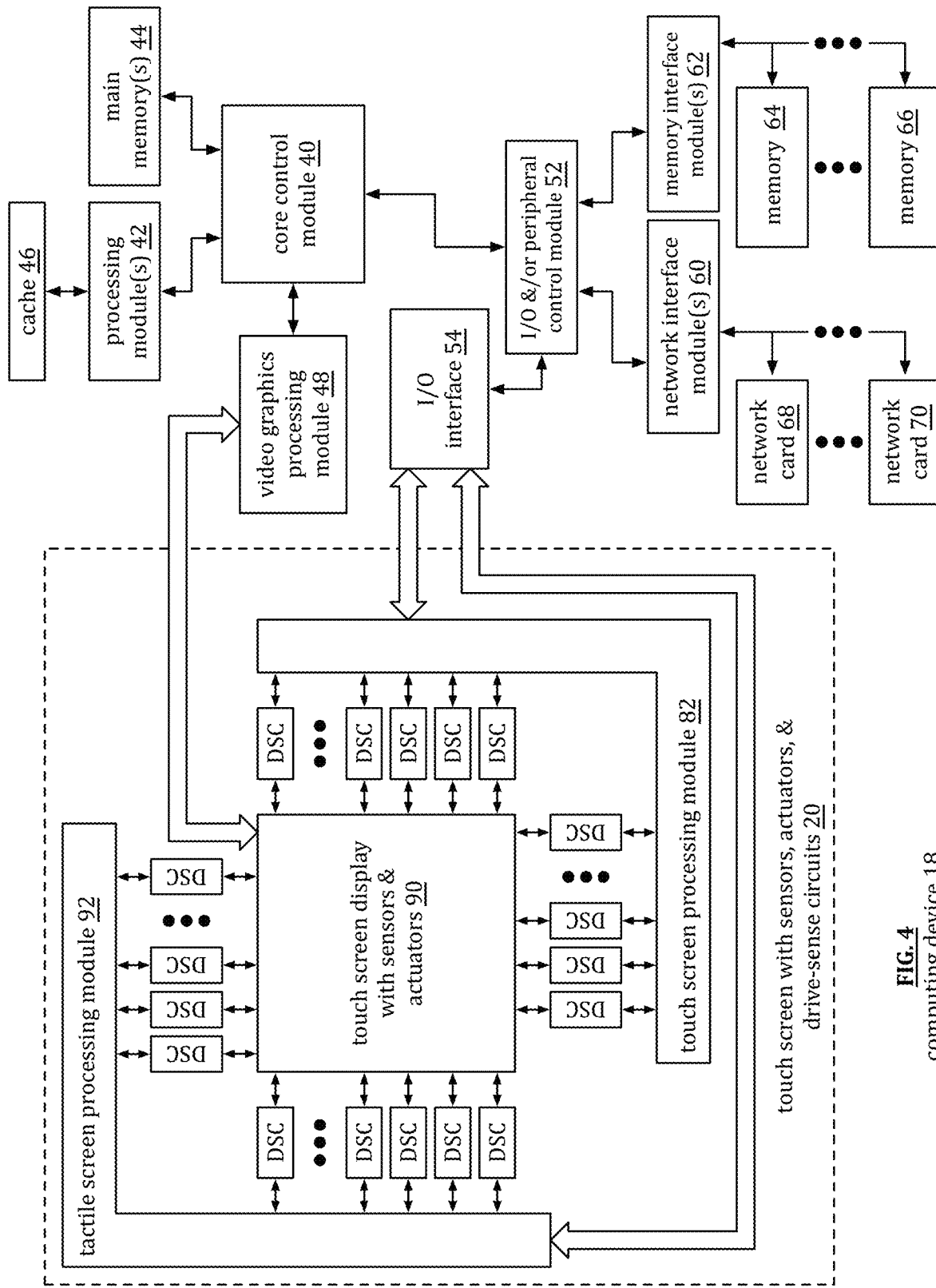
FIG. 4 computing device 18

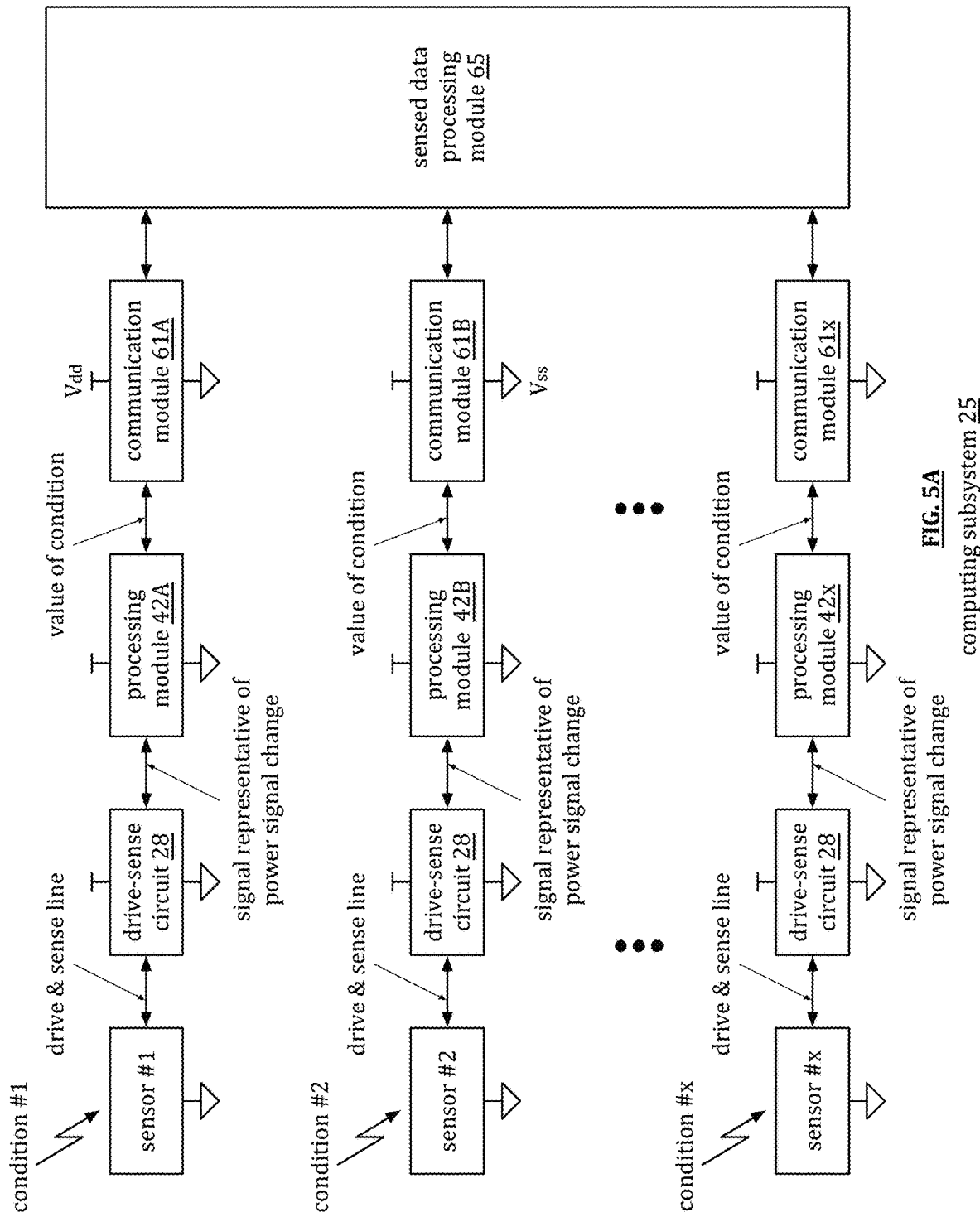

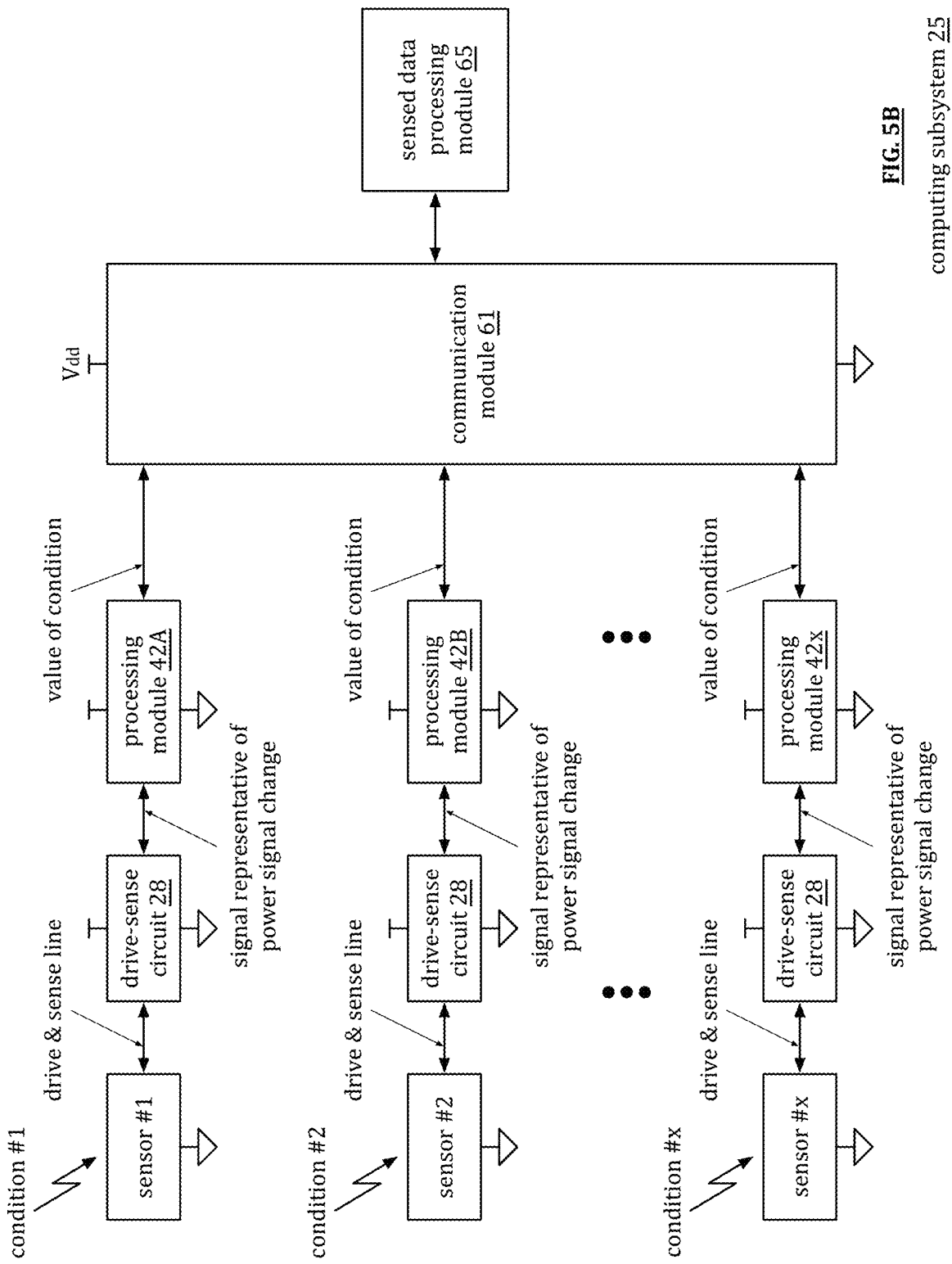

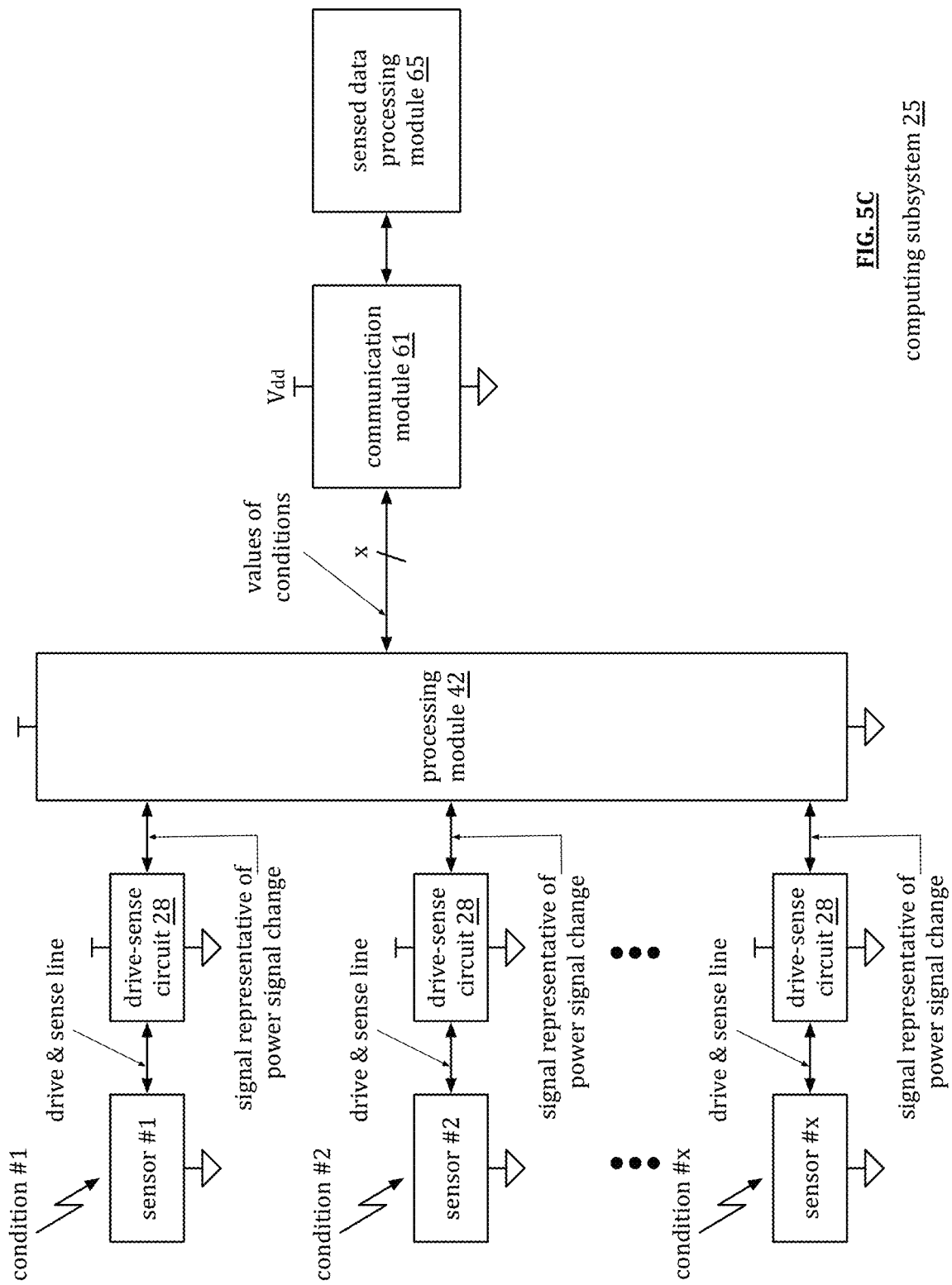

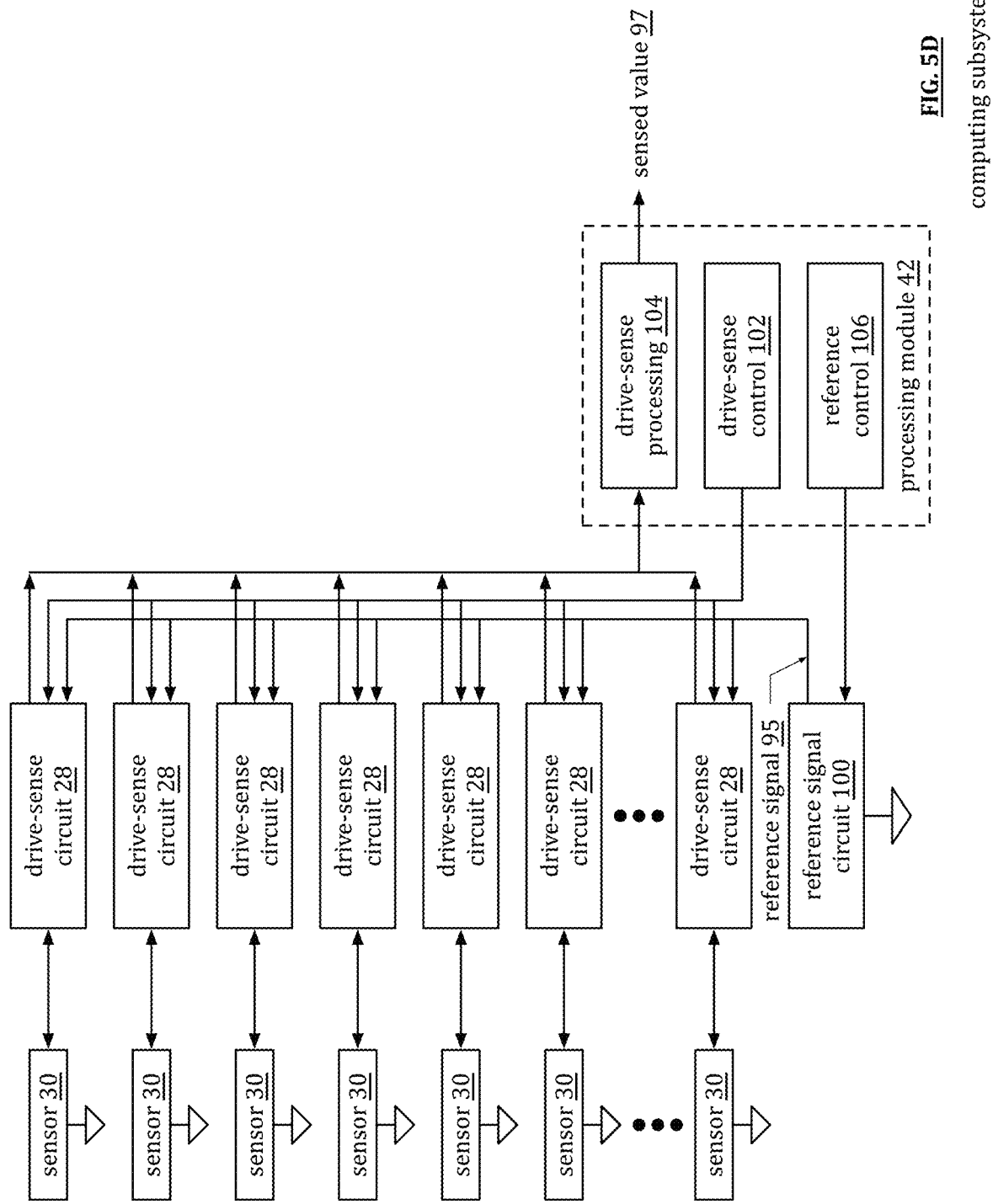

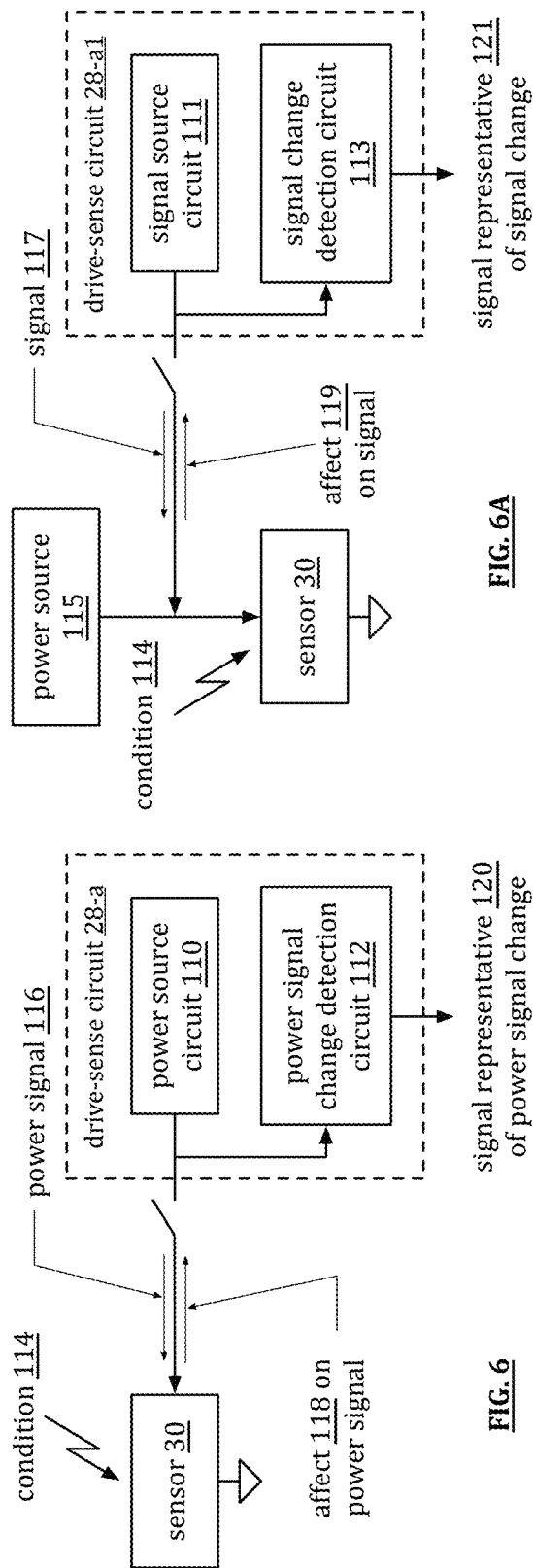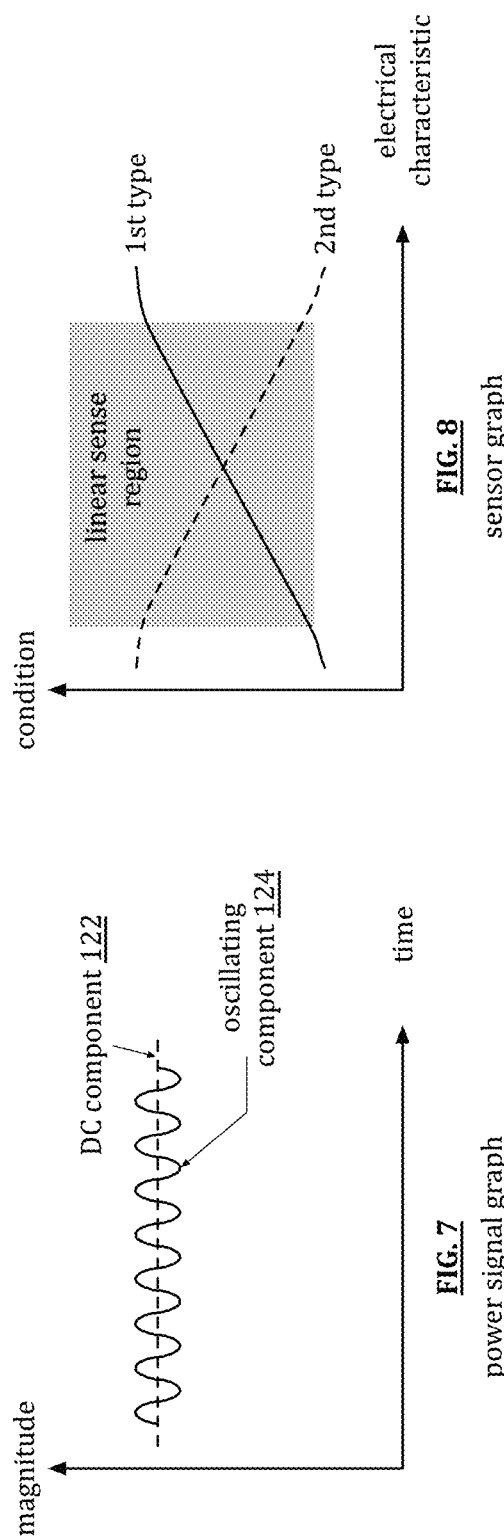

power signal graph power signal graph power signal graph power signal graph

1401

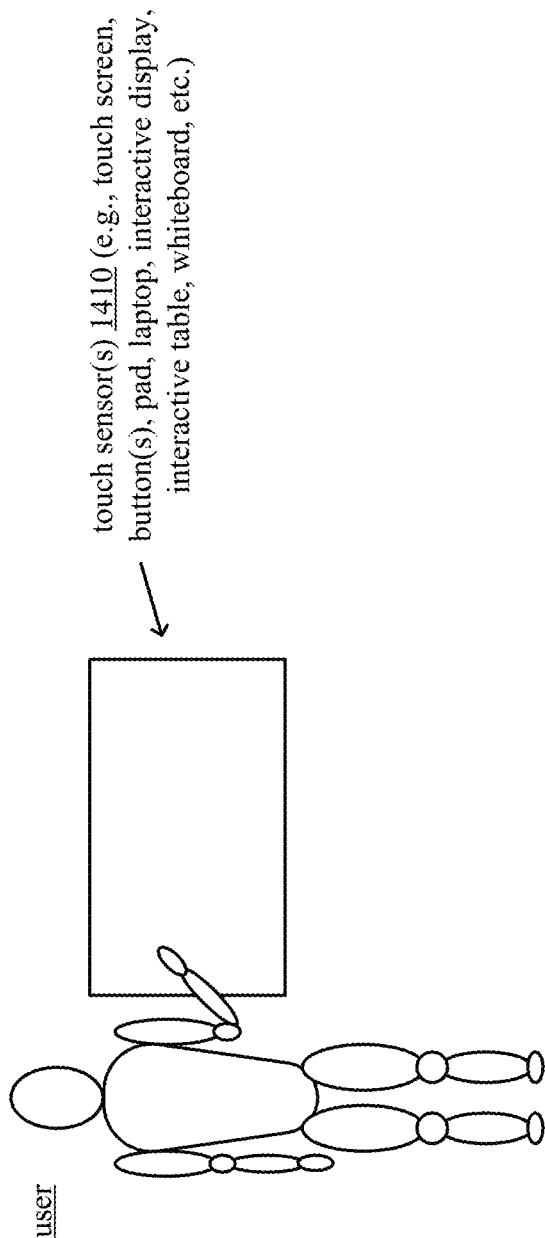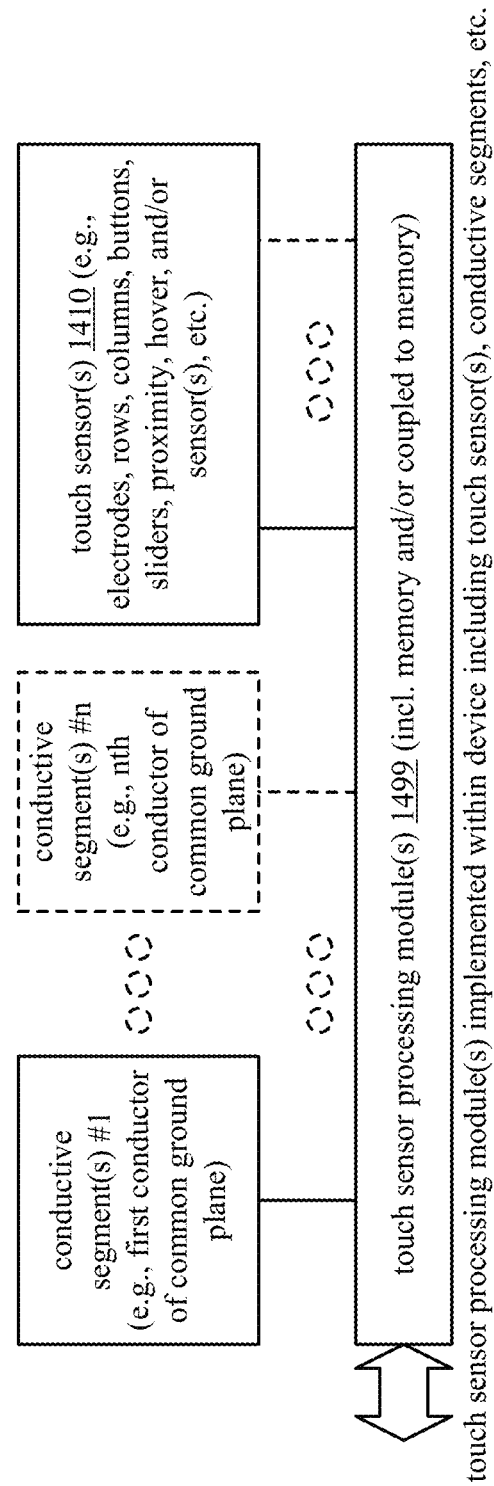
FIG. 14B
1402

1501

FIG. 15B
1502 touch sensor segments and common segment coplanar (same plane)

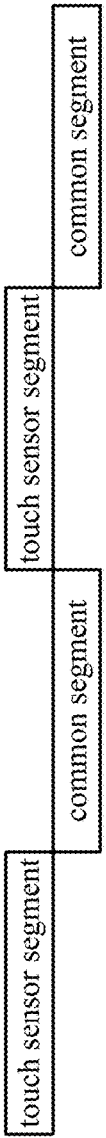

FIG. 15C
1503 touch sensor segments and common segments in different planes (multi-layer)

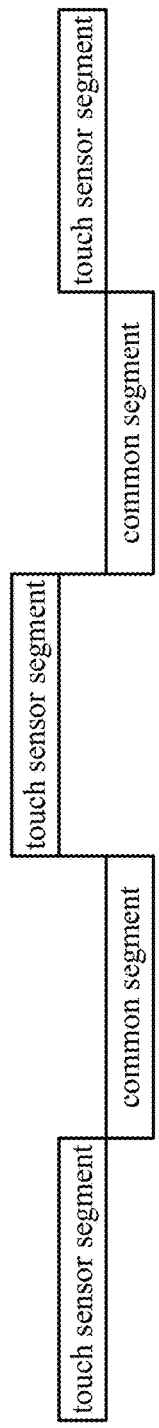

FIG. 15D
1504 touch sensor segments in different planes (e.g., Rs layer 1, Cs layer 2) and common segments (e.g., layer 3) in a different plane (multi-layer)

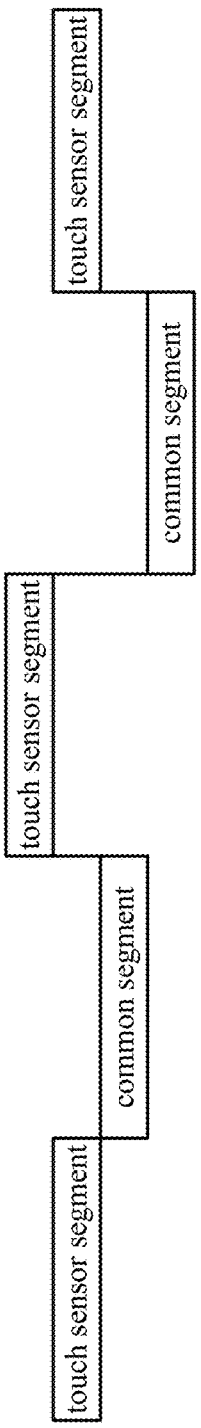

FIG. 15E
1505 touch sensor segments in different planes (e.g., Rs layer 1, Cs layer 2) and common segments in different planes (e.g., layer 3 and layer 4) in a different plane (multi-layer)

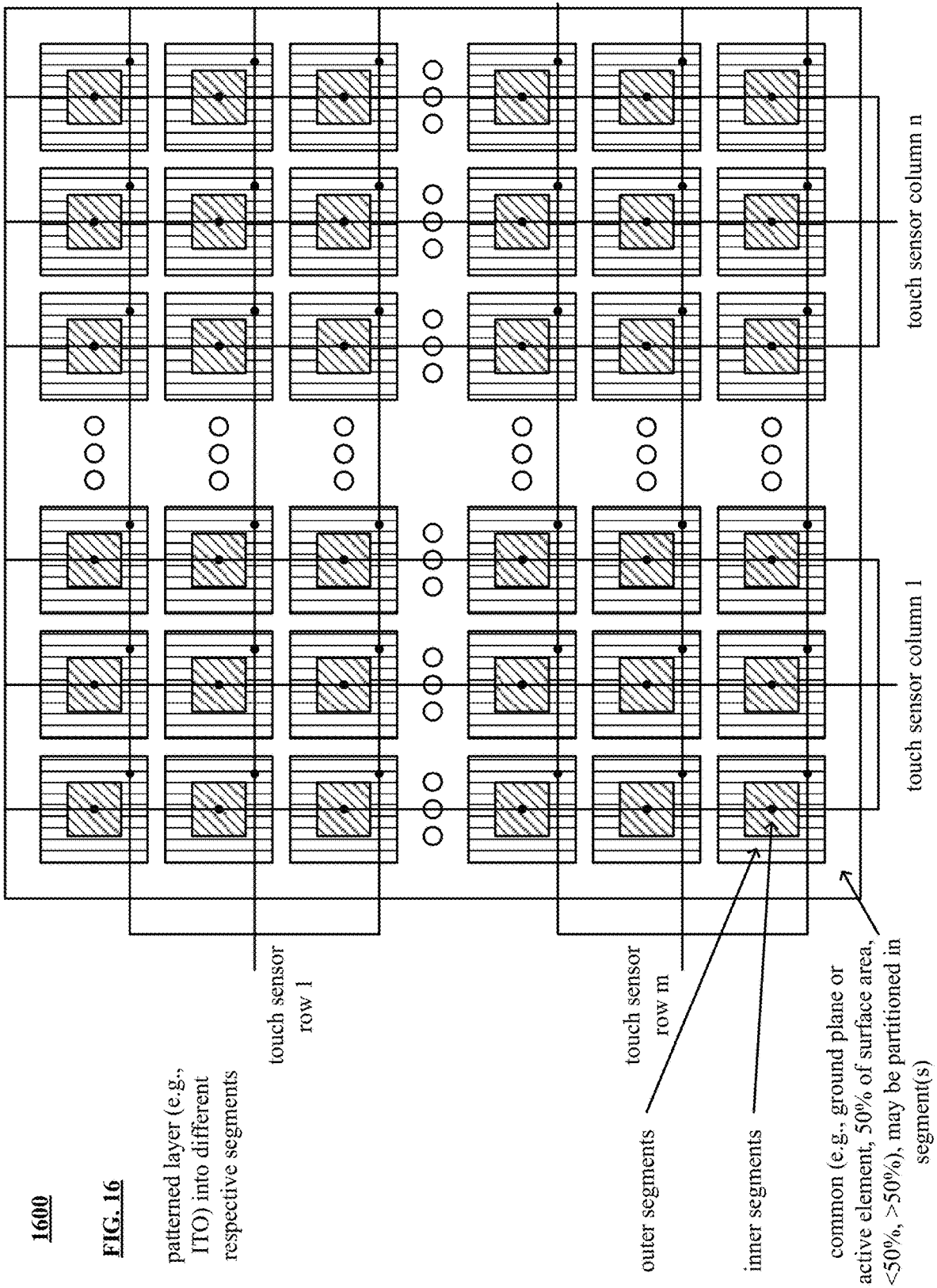

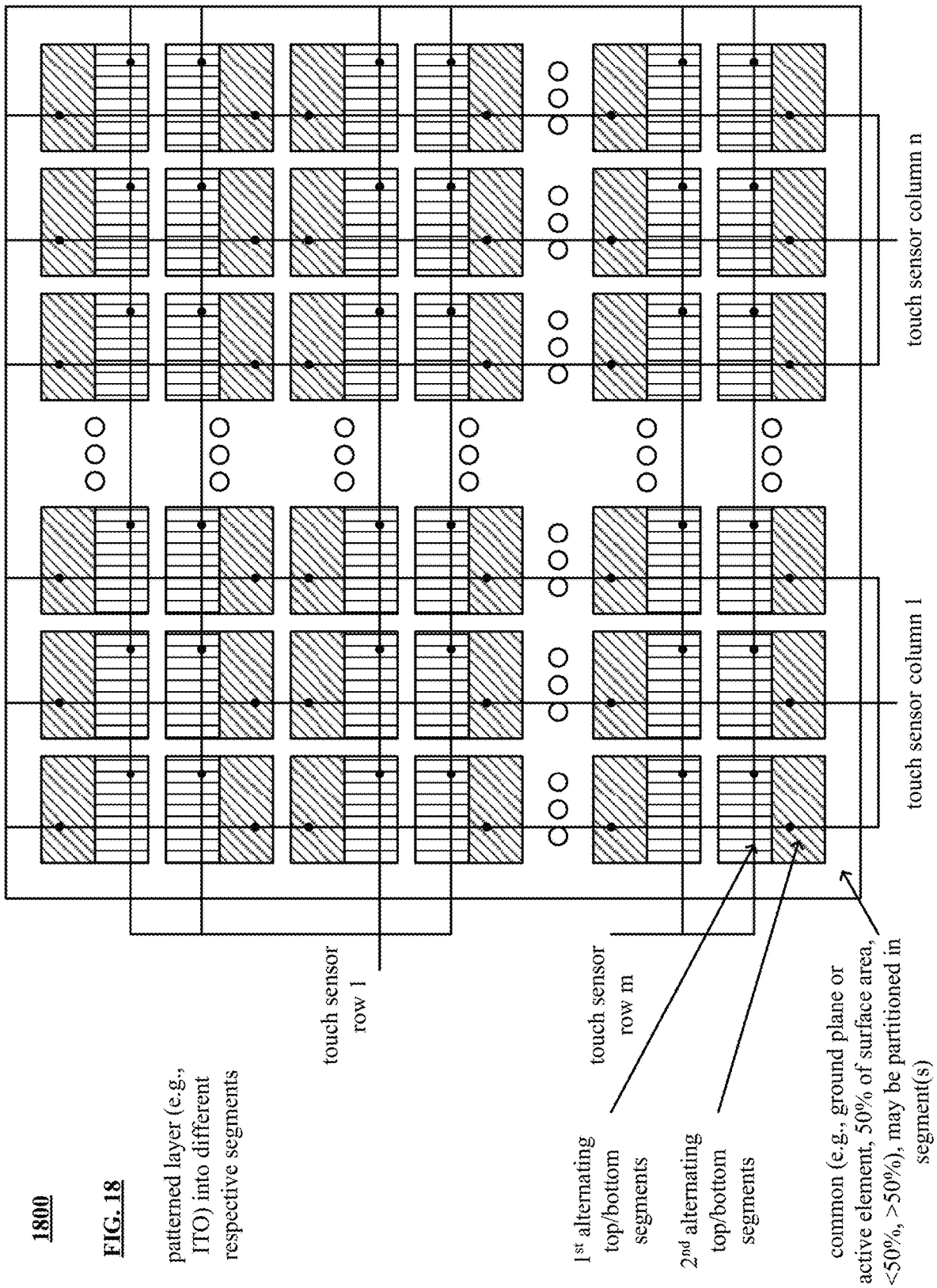

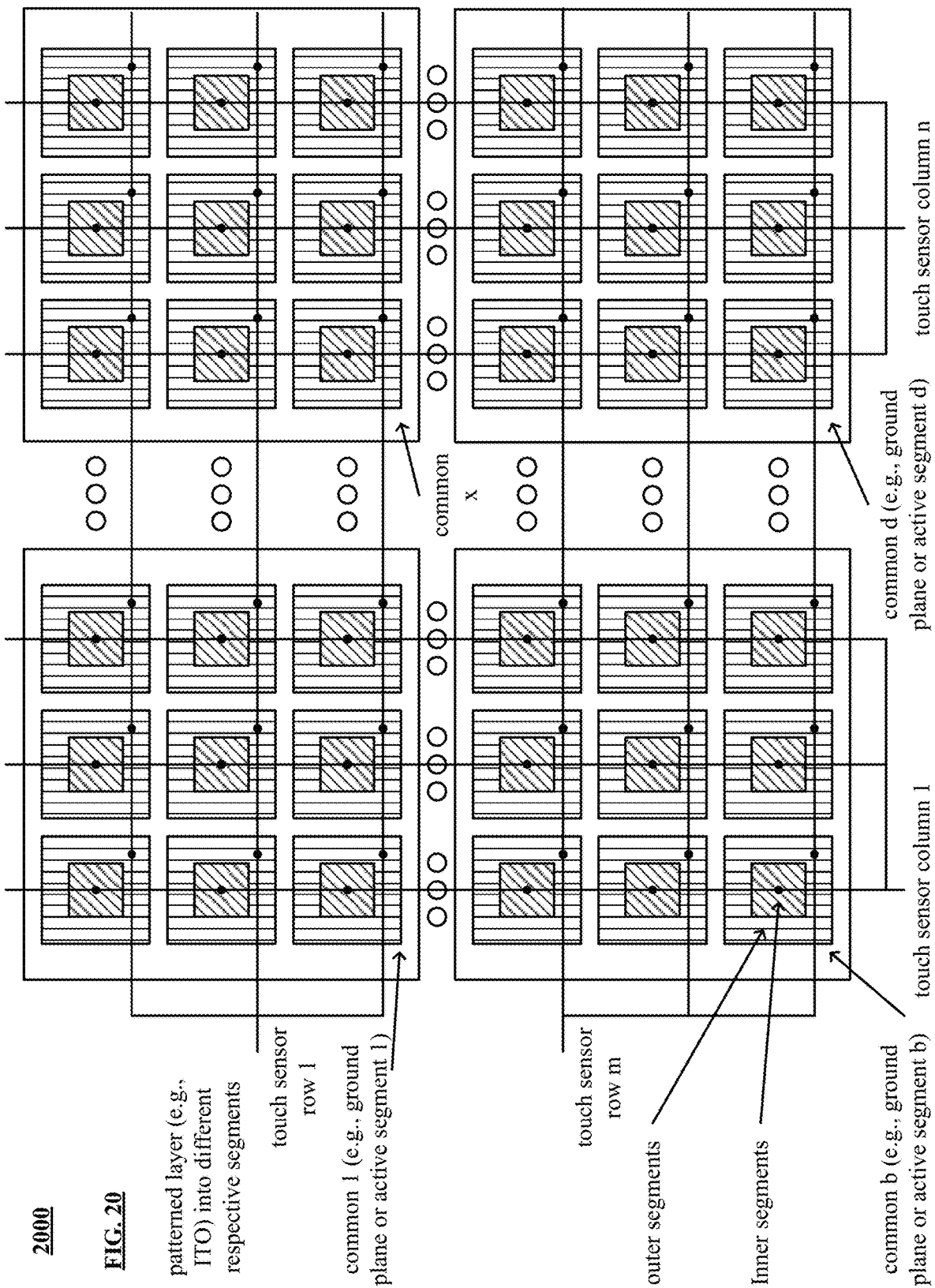

MULTI-CONDUCTOR TOUCH SYSTEM

CROSS REFERENCE TO RELATED PATENTS

The present U.S. Utility patent application claims priority pursuant to 35 U.S.C. § 120 as a continuation of U.S. Utility application Ser. No. 16/671,334, entitled "Multi-conductor touch system," filed Nov. 1, 2019, pending, which claims priority pursuant to 35 U.S.C. § 119(e) to U.S. Provisional Application No. 62/755,152, entitled "Multi-conductor touch system," filed Nov. 2, 2018, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

BRIEF DESCRIPTION OF THE SEVERAL VIEWS OF THE DRAWING(S)

FIG. 4 is a schematic block diagram of another embodiment of a computing device in accordance with the present invention;

FIG. 5A is a schematic plot diagram of a computing subsystem in accordance with the present invention;

FIG. 5B is a schematic block diagram of another embodiment of a computing subsystem in accordance with the present invention;

FIG. 5C is a schematic block diagram of another embodiment of a computing subsystem in accordance with the present invention;

FIG. 5D is a schematic block diagram of another embodiment of a computing subsystem in accordance with the present invention;

FIG. 6 is a schematic block diagram of a drive center circuit in accordance with the present invention;

FIG. 6A is a schematic block diagram of another embodiment of a drive sense circuit in accordance with the present invention;

FIG. 7 is an example of a power signal graph in accordance with the present invention;

FIG. 8 is an example of a sensor graph in accordance with the present invention;

FIG. 14B is a schematic block diagram of an embodiment of a computing device that includes one or more touch sensors in accordance with the present invention;

FIG. 15B is a schematic block diagram of an embodiment of various layers within a touchscreen display being implemented on a same plane;

FIG. 15C is a schematic block diagram of an embodiment of various layers within a touchscreen display being implemented within more than one plane;

FIG. 15D is a schematic block diagram of another embodiment of various layers within a touchscreen display being implemented within more than one plane;

FIG. 15E is a schematic block diagram of another embodiment of various layers within a touchscreen display being implemented within more than one plane;

FIG. 16 is a schematic block diagram of an embodiment of another patterned layer within a computing device that includes one or more touch sensors in accordance with the present invention;

FIG. 17 is a schematic block diagram of another embodiment of a patterned layer within a computing device that includes one or more touch sensors in accordance with the present invention;

FIG. 18 is a schematic block diagram of another embodiment of a patterned layer within a computing device that includes one or more touch sensors in accordance with the present invention;

FIG. 19 is a schematic block diagram of another embodiment of a patterned layer within a computing device that includes one or more touch sensors in accordance with the present invention;

FIG. 20 is a schematic block diagram of another embodiment of a patterned layer within a computing device that includes one or more touch sensors in accordance with the present invention;

DETAILED DESCRIPTION OF THE INVENTION

Figure 1:
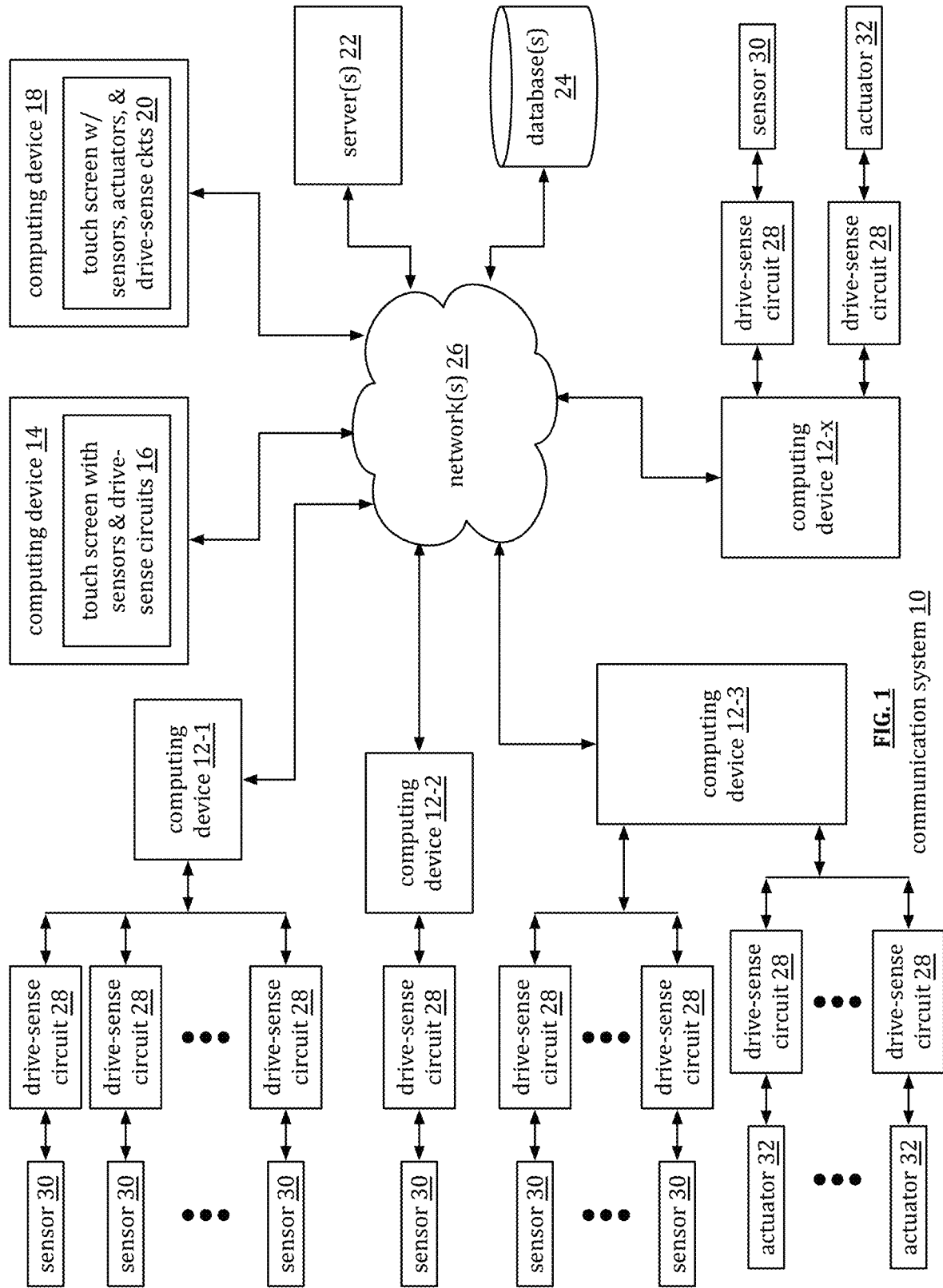
FIG. 1 is a schematic block diagram of an embodiment of a communication system in accordance with the present invention.

FIG. 1 is a schematic block diagram of an embodiment of a communication system 10 that includes a plurality of computing devices 12-10, one or more servers 22, one or more databases 24, one or more networks 26, a plurality of drive-sense circuits 28, a plurality of sensors 30, and a plurality of actuators 32. Computing devices 14 include a touchscreen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, electric field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an electric signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
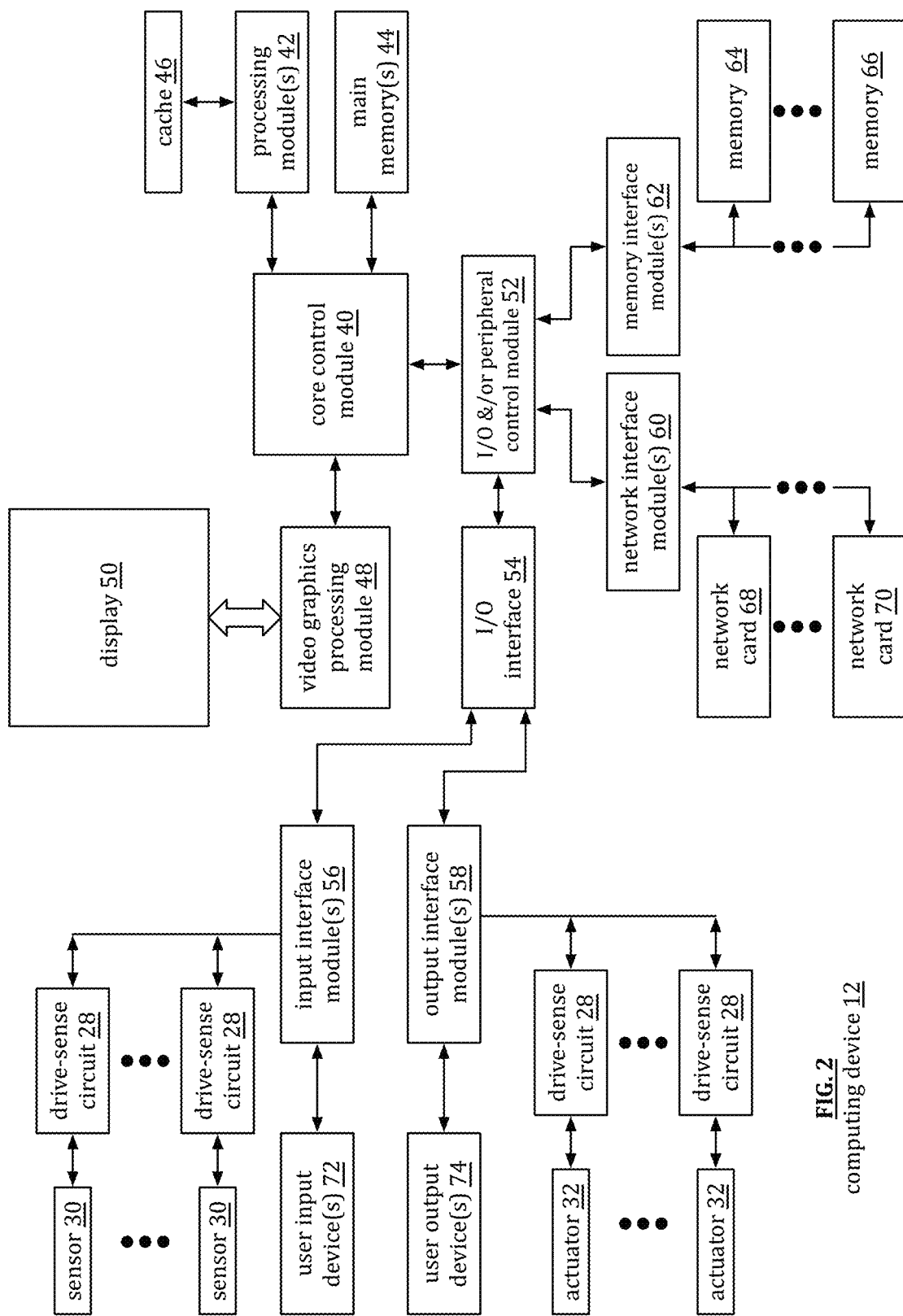
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
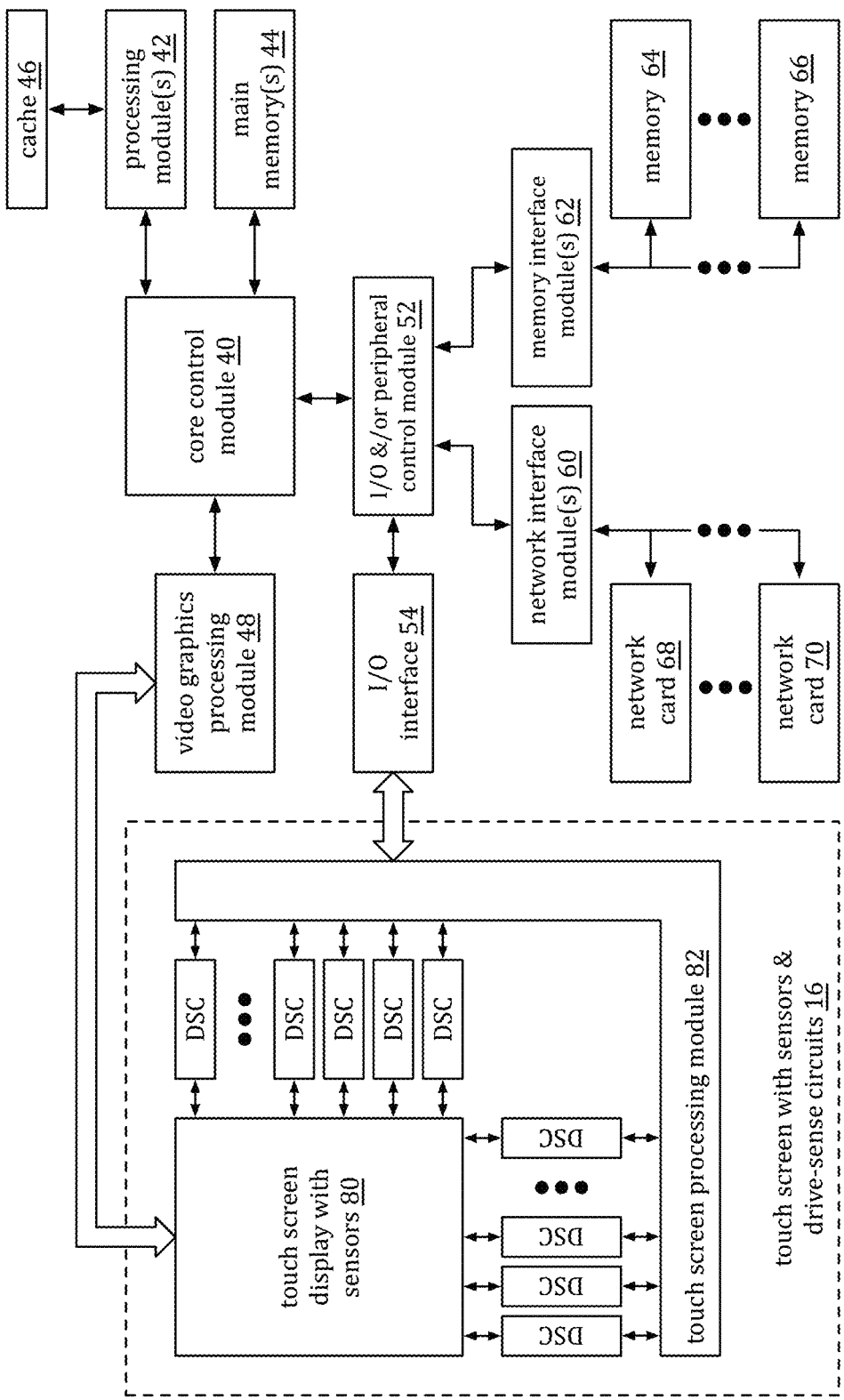
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touchscreen 16, an Input-Output (I/O) peripheral control module 52, one or more input interface modules 56, one or more output interface modules 58, one or more network interface modules 60, and one or more memory interface modules 62. The touchscreen 16 includes a touchscreen display 80, a plurality of sensors 30, a plurality of drive-sense circuits (DSC), and a touchscreen processing module 82.

Computing device 14 operates similarly to computing device 12 of FIG. 2 with the addition of a touchscreen as an input device. The touchscreen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touchscreen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a standalone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
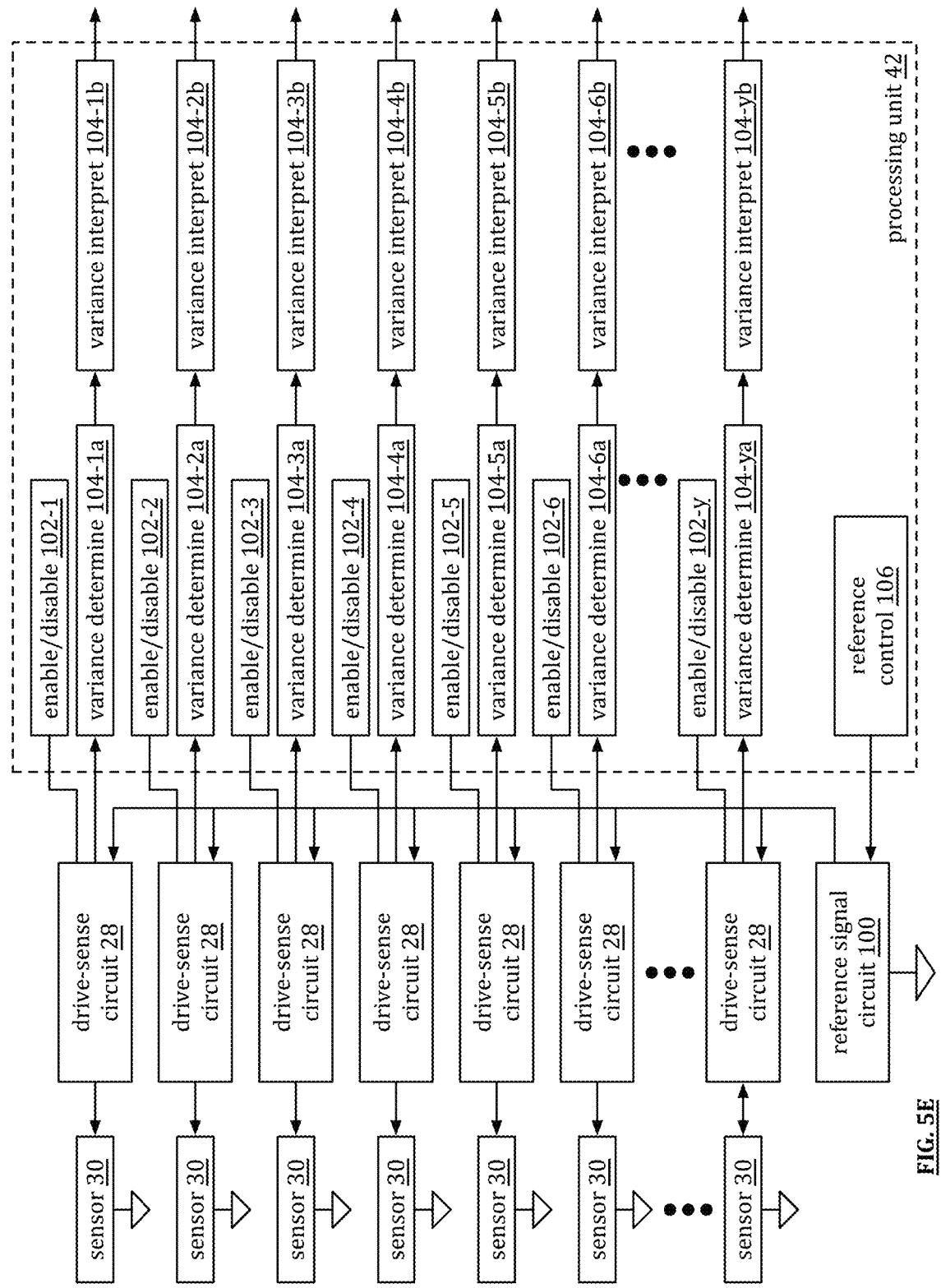
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through $y$ and variance interpreting modules 104-2a through $y$. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256) =25+33.6=58.6 degrees Celsius.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
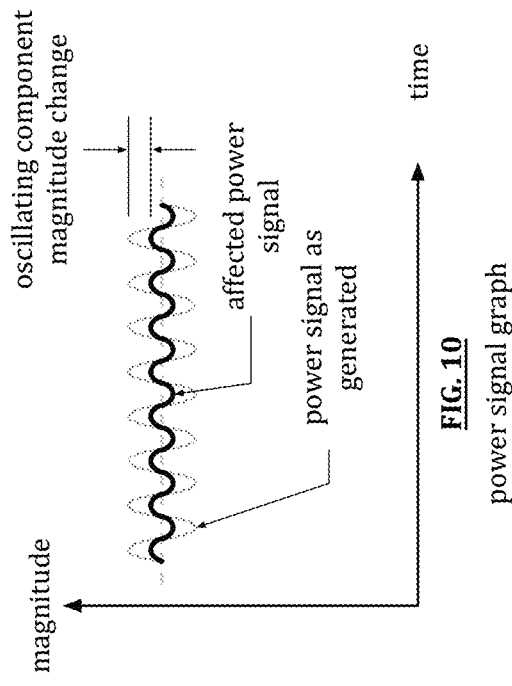
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
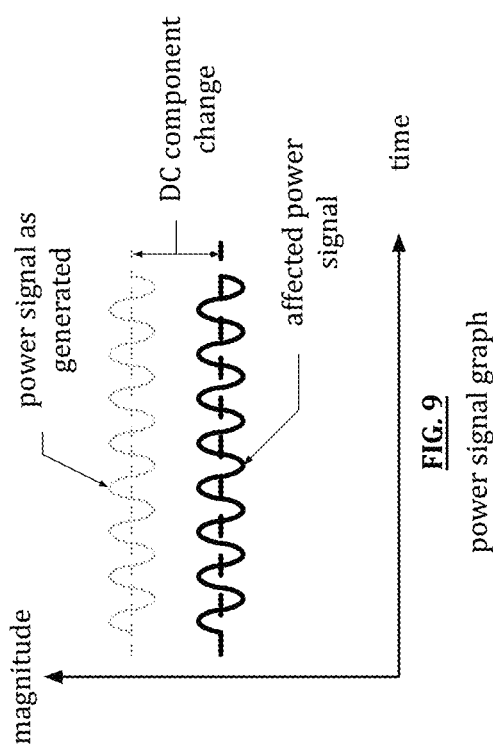
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11A:
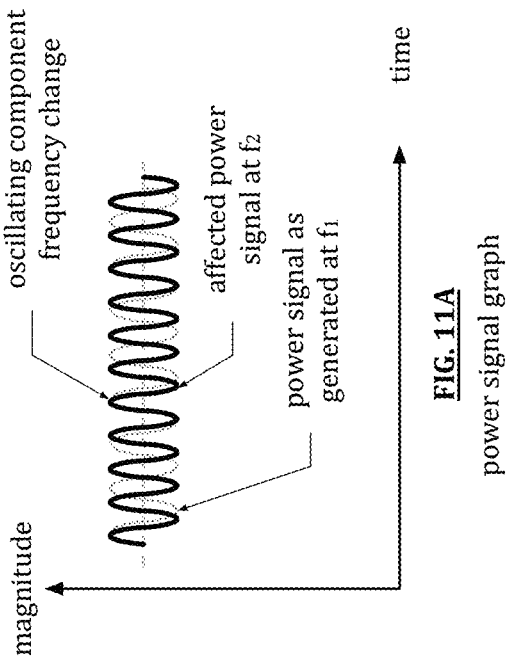
FIG. 11A is a schematic block diagram of another example of a power signal graph in accordance with the present invention.
Figure 11:
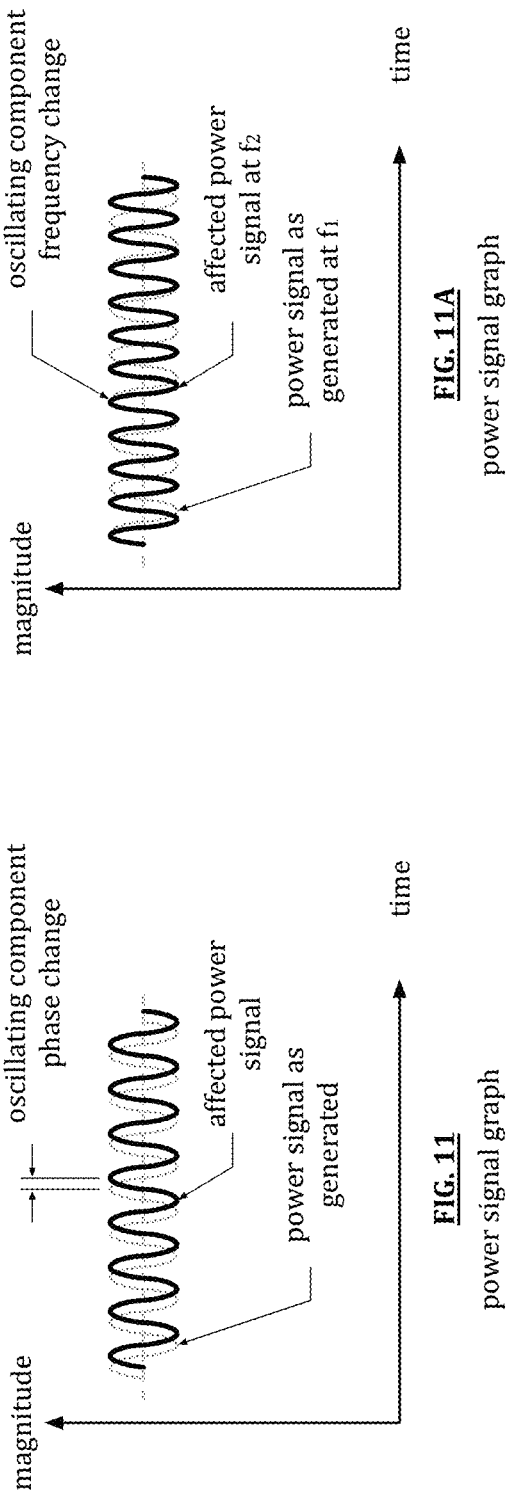
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

Figure 12:
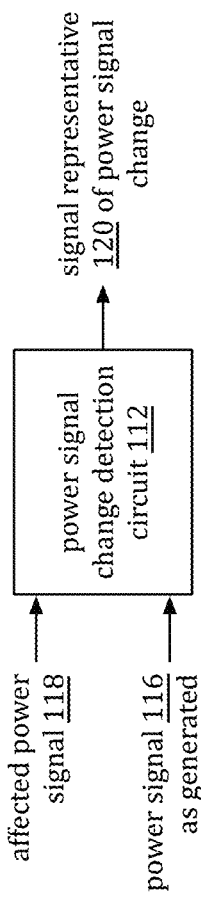
FIG. 12 is a schematic block diagram of an embodiment of a power signal change detection circuit in accordance with the present invention.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
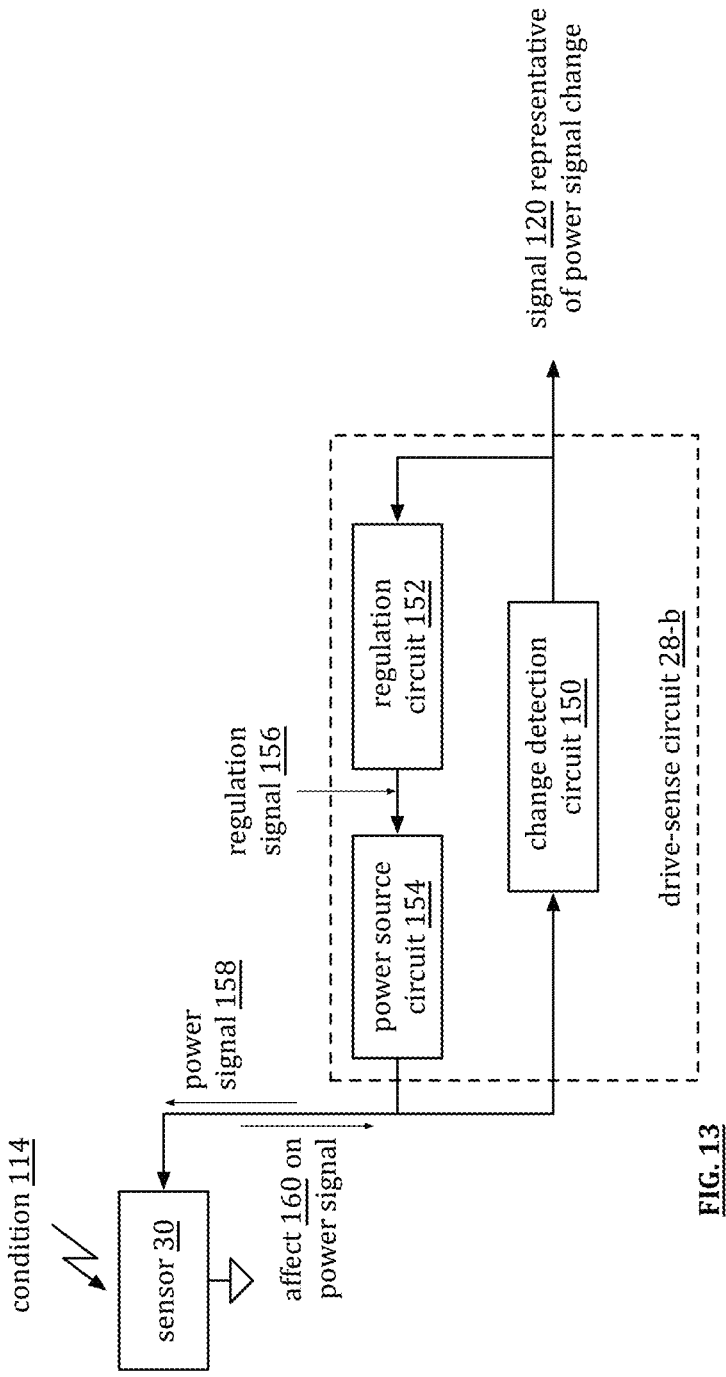
FIG. 13 is a schematic block diagram of another embodiment of a drive-sense circuit in accordance with the present invention.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE," filed Aug. 27, 2018, pending. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, trellis coded modulation (TCM), turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a conductor, a common ground segment or segments, a bus, a communication link, a load, an electrical coupling or connection, etc. associated with that DSC is also detectable. For example, a DSC that is associated with such a line, an electrode, a touch sensor, a conductor, a common ground segment or segments, a bus, a communication link, a load, an electrical coupling or connection, etc. is configured to detect any signal from one or more other lines, electrodes, touch sensors, buses, communication links, loads, electrical couplings or connections, etc. that get coupled into that line, electrode, touch sensor, conductor, common ground segment or segments, communication link, battery, load, electrical coupling or connection, etc.

Note that the different respective signals that are driven and simultaneously sensed by one or more DSCs may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113,379, etc. and/or their equivalents.

Note that certain of the following diagrams show one or more processing modules. In certain instances, the one or more processing modules is configured to communicate with and interact with one or more other devices including one or more of DSCs, one or more components associated with a DSC, etc. Note that any such implementation of one or more processing modules may include integrated memory and/or be coupled to other memory. At least some of the memory stores operational instructions to be executed by the one or more processing modules. In addition, note that the one or more processing modules may interface with one or more other devices, components, elements, etc. via one or more communication links, networks, communication pathways, channels, etc. (e.g., such as via one or more communication interfaces of the device, such as may be integrated into the one or more processing modules or be implemented as a separate component, circuitry, etc.).

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

Figure 13A:
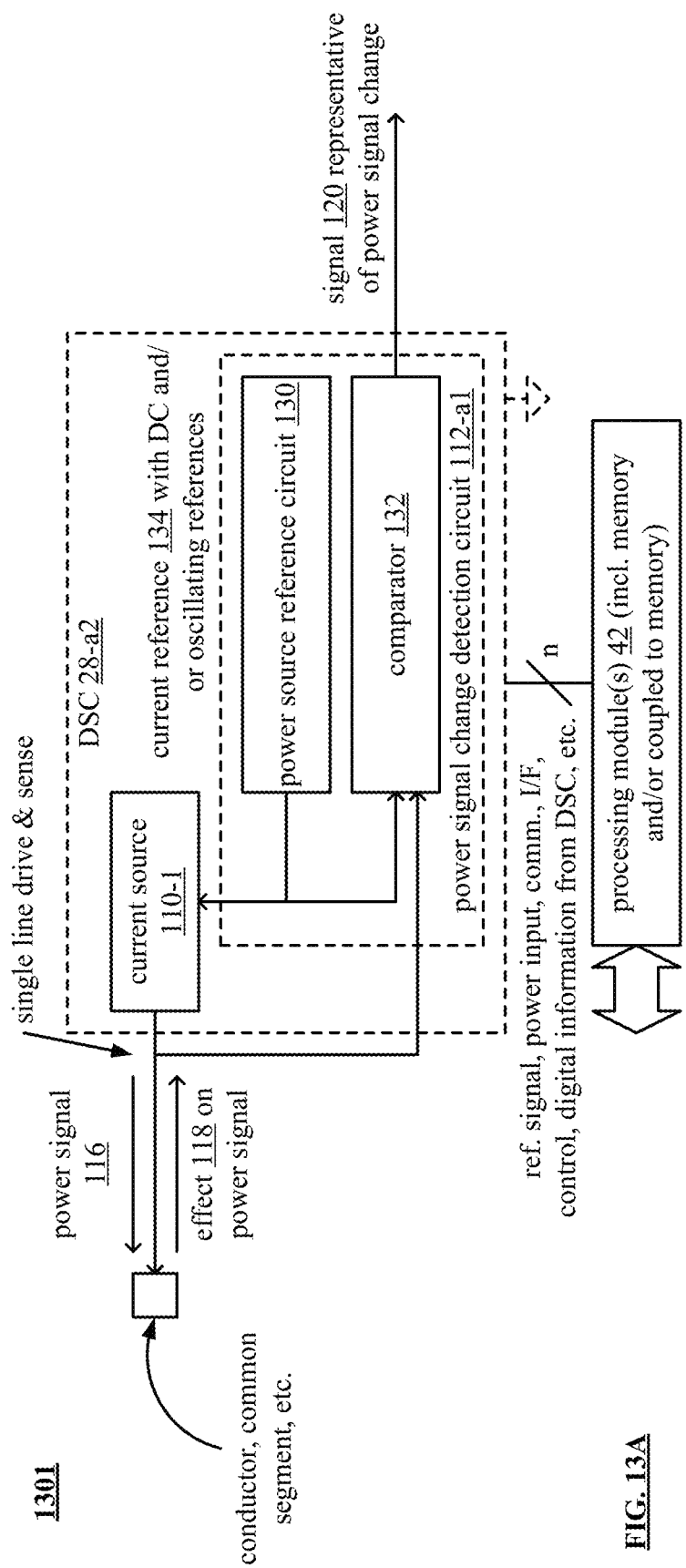
FIG. 13A is a schematic block diagram of an embodiment of a DSC that is interactive with a conductor, a common segment, etc. in accordance with the present invention.

FIG. 13A is a schematic block diagram of an embodiment 1301 of a DSC that is interactive with a conductor, a common segment, etc. in accordance with the present invention. Similar to other diagrams, examples, embodiments, etc. herein, the DSC 28-a2 of this diagram is in communication with one or more processing modules 42. The DSC 28-a2 is configured to provide a signal (e.g., a transmit signal, a monitoring signal, etc.) to the conductor, the common segment, etc. via a single line and simultaneously to sense that signal via the single line. In some examples, sensing the signal includes detection of an electrical characteristic of the electrode that is based on a response of the conductor, the common segment, etc. to that signal. Examples of such an electrical characteristic may include detection of an impedance of the conductor, the common segment, etc. such as a change of capacitance of the conductor, the common segment, etc., detection of one or more signals coupled into the conductor, the common segment, etc. such as from one or more other electrodes, and/or other electrical characteristics. In addition, note that the conductor, the common segment, etc. may be implemented in a capacitive imaging glove in certain examples.

In some examples, the DSC 28-a2 is configured to provide the signal to the electrode to perform any one or more of capacitive imaging of an element (e.g., such as a glove, sock, a bodysuit, or any portion of a capacitive imaging component associated with the user and/or operative to be worn and/or used by a user) that includes the electrode (e.g., such as a capacitive imaging glove, a capacitive imaging sock, a capacitive imaging bodysuit, or any portion of a capacitive imaging component associated with the user and/or operative to be worn and/or used by a user), digit movement detection such as based on a competitive imaging glove, inter-digit movement detection such as based on a competitive imaging glove, movement detection within a three-dimensional (3-D) space, and/or other purpose(s).

This embodiment of a DSC 28-*a*2 includes a current source 110-1 and a power signal change detection circuit 112-*a*1. The power signal change detection circuit 112-*a*1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the conductor, the common segment, etc. has an effect on the current power signal 116. For example, if the impedance of the conductor, the common segment, etc. decreases and the current power signal 116 remains substantially unchanged, the voltage across the conductor, the common segment, etc. is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the conductor, the common segment, etc. substantially matches the given impedance (Z), then the comparator's output is reflective of the impedances substantially matching. If the impedance of the conductor, the common segment, etc. is greater than the given impedance (Z), then the comparator's output is indicative of how much greater the impedance of the conductor, the common segment, etc. is than that of the given impedance (Z). If the impedance of the conductor, the common segment, etc. is less than the given impedance (Z), then the comparator's output is indicative of how much less the impedance of the conductor, the common segment, etc. is than that of the given impedance (Z).

Figure 13B:
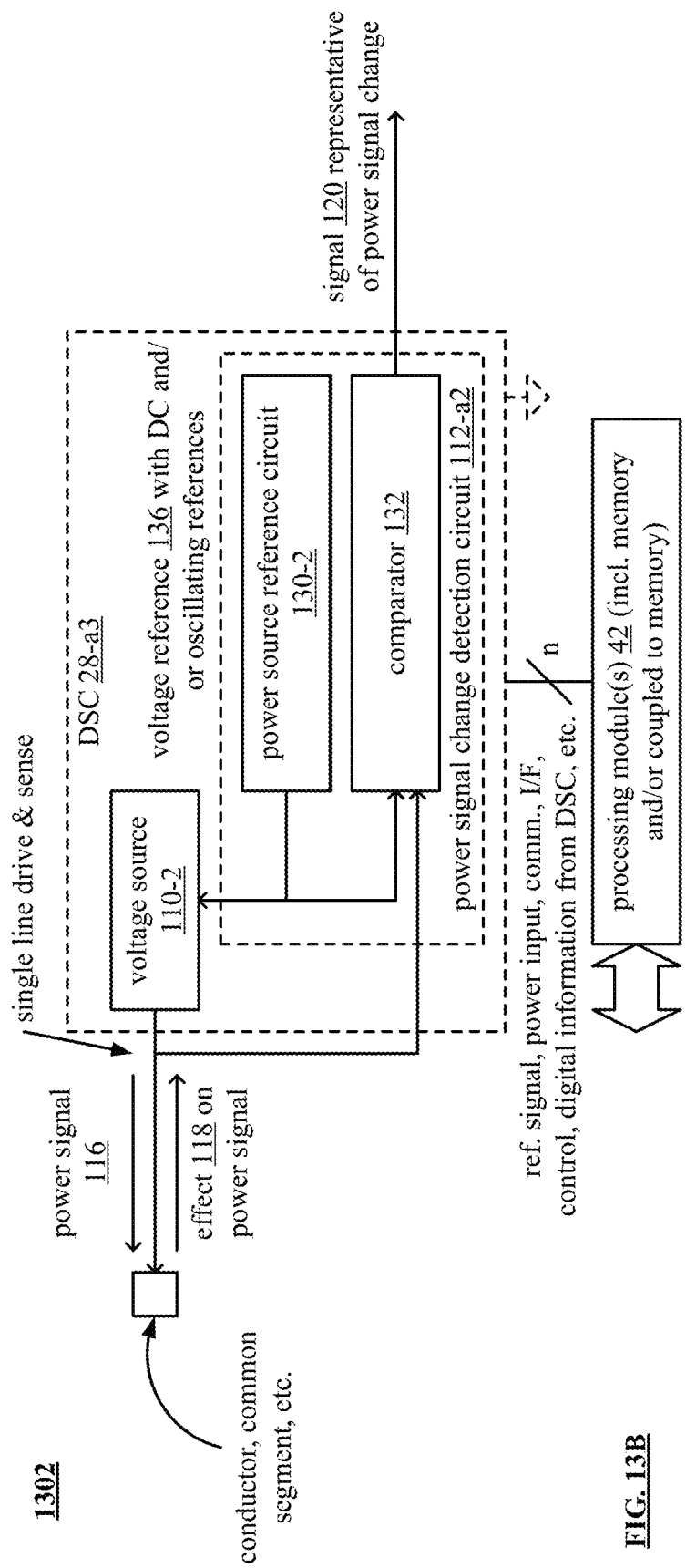
FIG. 13B is a schematic block diagram of another embodiment of a DSC that is interactive with a conductor, a common segment, etc. in accordance with the present invention.

FIG. 13B is a schematic block diagram of another embodiment 1302 of a DSC that is interactive with a conductor, a common segment, etc. in accordance with the present invention. Similar to other diagrams, examples, embodiments, etc. herein, the DSC 28-*a*3 of this diagram is in communication with one or more processing modules 42. Similar to the previous diagram, although providing a different embodiment of the DSC, the DSC 28-*a*3 is configured to provide a signal to the conductor, the common segment, etc. via a single line and simultaneously to sense that signal via the single line. In some examples, sensing the signal includes detection of an electrical characteristic of the conductor, the common segment, etc. that is based on a response of the conductor, the common segment, etc. to that signal. Examples of such an electrical characteristic may include detection of an impedance of the conductor, the common segment, etc. such as a change of capacitance of the conductor, the common segment, etc., detection of one or more signals coupled into the conductor, the common segment, etc. such as from one or more other electrodes, and/or other electrical characteristics. In addition, note that the conductor, the common segment, etc. may be implemented in a capacitive imaging glove in certain examples.

This embodiment of a DSC 28-*a*3 includes a voltage source 110-2 and a power signal change detection circuit 112-*a*2. The power signal change detection circuit 112-*a*2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the conductor, the common segment, etc. has an effect on the voltage power signal 116. For example, if the impedance of the conductor, the common segment, etc. decreases and the voltage power signal 116 remains substantially unchanged, the current through the conductor, the common segment, etc. is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the conductor, the common segment, etc. substantially matches the given impedance (Z), then the comparator's output is reflective of the impedances substantially matching. If the impedance of the conductor, the common segment, etc. is greater than the given impedance (Z), then the comparator's output is indicative of how much greater the impedance of the conductor, the common segment, etc. is than that of the given impedance (Z). If the impedance of the conductor, the common segment, etc. is less than the given impedance (Z), then the comparator's output is indicative of how much less the impedance of the conductor, the common segment, etc. is than that of the given impedance (Z).

Figure 14A:
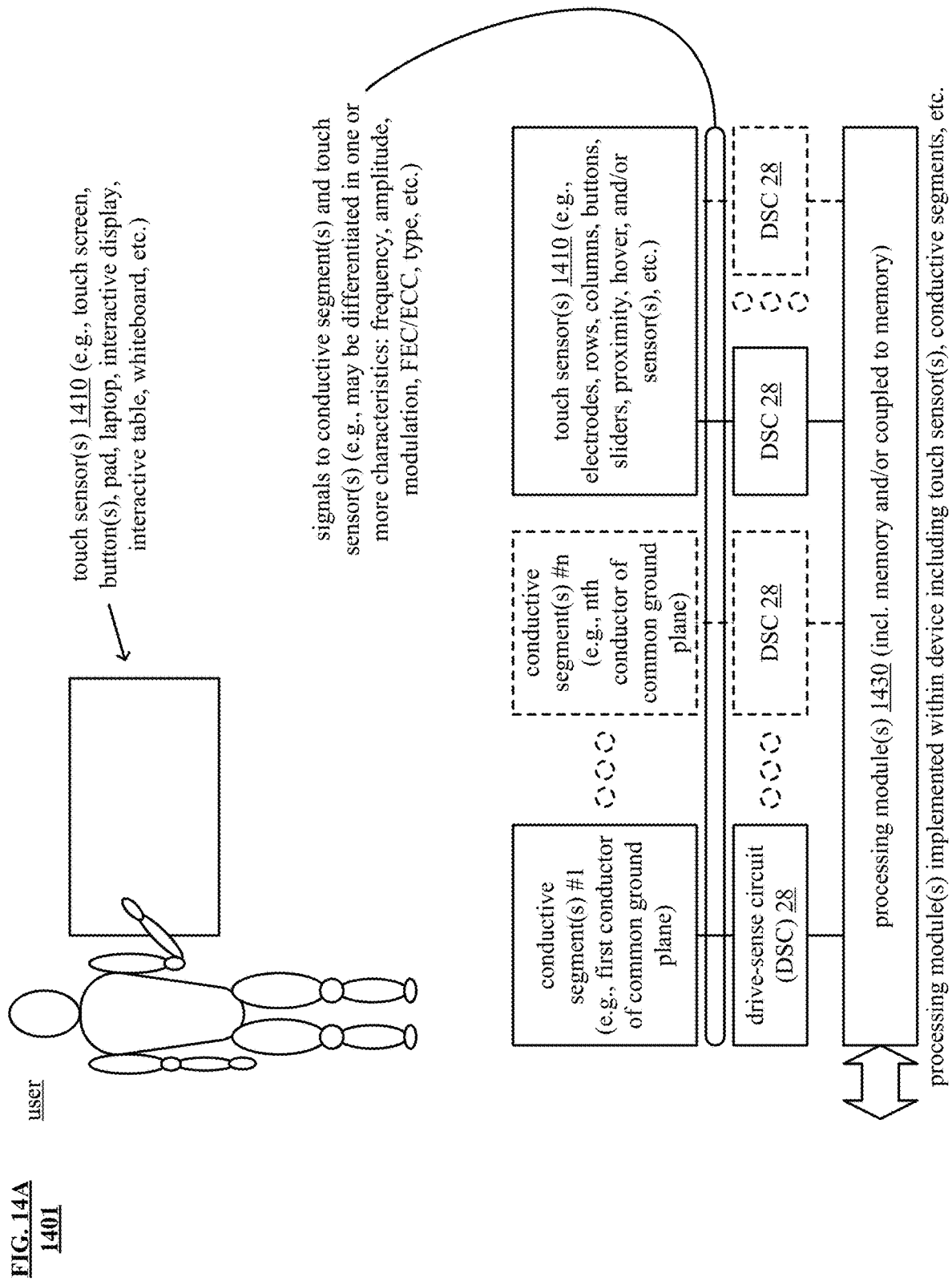
FIG. 14A is a schematic block diagram of an embodiment of a computing device that includes one or more touch sensors in accordance with the present invention.

FIG. 14A is a schematic block diagram of an embodiment 1401 of a computing device that includes one or more touch sensors in accordance with the present invention. The one or more touch sensors 1410 may be of any of a variety of one or more types including any one or more of a touch screen, a button, an electrode, an external controller, rows of electrodes, columns of electrodes, a matrix of buttons, an array of buttons, a slider, a film that includes any desired implementation of components to facilitate touch sensor operation, and/or any other configuration by which interaction with the touch sensor may be performed. Note that the one or more touch sensors 1410 may be implemented in any of a variety of types of devices. Examples of such devices may include a touch screen, a pad device, a laptop, an interactive display, an interactive table, a whiteboard, a smartphone, tablet device, etc. Note also that such a device that includes the one or more touch sensors 1410 may be of any of a variety of sizes such as being a handheld type device such as a smart phone, a tablet device, pad device, etc., or such as being a larger device such as a television with interactive capability (e.g., having a diagonal size of 24 inches, 32 inches, 42 inches, 70 inches, or any other dimension), or such as being an even larger device such as an interactive display implemented on a wall, in a public area such as in a shopping mall, a grocery store, outside near a sidewalk, etc. (e.g., having a diagonal size of 120 inches or more, or any other dimension).

In some examples, note that the one or more touch sensors 1410 are implemented using electrodes composed of conductive material. The electrodes may be implemented in any variety of ways including one or more of rows, columns, buttons, sliders, etc. and may be limited to perform a number of different sensing operations including proximity detection, hover detection, touch detection, etc.

Note that such interaction of a user with a touch sensor may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor). With respect to the various embodiments, implementations, etc. of various respective touch sensors as described herein, note that they may also be of any such variety of one or more types.

One example of such interaction it was with the one or more touch sensors 1410 is via capacitive coupling to a touch sensor. Such capacitive coupling may be achieved from a user, via a stylus, an active element such as an electronic pen (e-pen), and/or any other element implemented to perform capacitive coupling to the touch sensor. In some examples, note that the one or more touch sensors 1410 are also implemented to detect user interaction based on user touch (e.g., via capacitive coupling (CC) from a user, such as a user's finger, to the one or more touch sensors 1410).

At the top of the diagram, a user is shown as interacting with the one or more touch sensors 1410. In alternative examples, a user may interact with the one or more touch sensors 1410 using an e-pen that is implemented to transmit a signal that is detected by the one or more touch sensors 1410. In some examples, the e-pen is configured to transmit a signal having unique characteristics associated with that e-pen and/or a user who is associated with the e-pen. For example, when different respective signals are transmitted from the different respective e-pens, the one or more touch sensors 1410 is implemented to detect which of the e-pens (and correspondingly which of the users) is interacting with the one or more touch sensors 1410.

At the bottom of the diagram, one or more processing modules 1430 is coupled to drive-sense circuits (DSCs) 28. Note that the one or more processing modules 1430 may include integrated memory and/or be coupled to other memory. At least some of the memory stores operational instructions to be executed by the one or more processing modules 1430. A first one or more DSCs 28 is/are implemented to drive and simultaneously to sense first one or more signals provided to the one or more touch sensors 1410.

In addition, a second one or more DSCs 28 is/are implemented to drive and simultaneously to sense second one or more signals provided to one or more conductive segments (e.g., shown as conductive segment 1, and optionally up to and including conductive segment n). In some examples, there is as few as one single conductive segment that is separate from the one or more touch sensors 1410. In other examples, there are multiple different respective conductive segments that are separate from the one or more touch sensors 1410.

In addition, in some examples, note that the one or more conductive segments and the one or more touch sensors 1410 are implemented using the same material of a common layer within the device, and that material is partitioned, pattern, subdivided, etc. to effectuate the one or more conductive segments and the one or more touch sensors 1410. For example, the different respective portions, segments, etc., of the material are appropriately connected (e.g., using metal lines and vias, such as metal lines providing electrical connectivity and the metal lines also being connected to the respective portions, segments using vias, etc., coupling, etc.). For example, a first touch sensor is implemented using a first one or more segments of the material (e.g., connected and/or coupled together using metals lines and vias), a second touch sensor is implemented using a second one or more segments of the material (e.g., connected and/or coupled together using metals lines and vias), and the one or more other conductive segments are implemented using third one or more segments of the material (e.g., connected and/or coupled together using metals lines and vias).

In certain examples, the one or more conductive segments and the one or more touch sensors 1410 are all implemented within the same plane of a device. For example, the one or more touch sensors and the one or more segments of the common portion are all implemented within the same plane of a device.

In other examples, the conductive segments of the common portion and the one or more touch sensors 1410 are implemented within different planes of a device (e.g., the one or more touch sensors 1410 implemented within one plane, and the one or more conductive segments implemented within another plane, or alternatively, a first at least one of the one or more touch sensors 1410 is implemented within a first plane, a second at least one of the one or more touch sensors 1410 is implemented within a second plane, and a first at least one of the one or more touch sensors 1410 is implemented within a third plane, and/or a second at least one of the one or more touch sensors 1410 is implemented within a fourth plane).

In some examples, that the one or more segments of the common portion are active elements and serviced respectively by one or more DSC 28 or some other components operative to process signals to detect user interaction with the one or more segments of the common portion. In other examples, that the one or more segments of the common portion are not active elements and are not serviced respectively by one or more DSC 28 or some other components operative to process signals to detect user interaction with the one or more segments of the common portion. For example, the one or more segments of the common portion are not electrically connected to any DSC 28 or other components. For example, the one or more segments of the common portion are operative to reduce the overall capacitance of the device that includes the one or more touch sensors 1410 (e.g., which may be implemented as a touchscreen display) and thereby improving the operation of the one or more touch sensors 1410 and the operation of the device including them as well.

In addition, the DSCs 28 are configured simultaneously to drive and sense respective signals provided to the one or more conductive segments and the one or more touch sensors 1410. Note that the signals provided to these elements may be differentiated in any one or more different characteristics. Examples of such characteristics may include frequency, amplitude, modulation, forward error correction (FEC)/error checking and correction (ECC), type, etc. Alternatively, in some examples, note that a common signal may be implemented and provided to all of these elements in accordance with a time division operation such as time division multiple access (TDMA) such that a first signal is provided via a first DSC 28 to a first element at a first time, a second signal is provided via a second DSC 28 to a second element at a second time, and so on. In even other alternative embodiments, when sufficient filtering and processing may be implemented, a common signal may be implemented in provided to all of these elements concurrently, simultaneously, at the same time, etc.

Note that the material that is used to implement the one or more conductive segments and the one or more touch sensors 1410 may be any desired and appropriate material. In some examples, they are implemented using indium tin oxide (ITO).

Considering an example of the one or more conductive segments and the one or more touch sensors 1410 being implemented within the same plane of a device, a portion of the layer is implemented as the one or more touch sensors 1410. Another portion of the layer is implemented as the one or more conductive segments. In some examples, the one or more conductive segments occupies approximately 50% of the area of the layer, and the one or more touch sensors 1410 occupy approximately 50% of the layer. In other examples, the one or more conductive segments occupies more than 50% of the area of the layer, and the one or more touch sensors 1410 occupy less than 50% of the layer. For example, in some examples, the one or more conductive segments occupies approximately 80% of the area of the layer, and the one or more touch sensors 1410 occupy approximately 20% of the layer, or vice versa. Note that a device may be implemented using any desired partitioning of the conductive material for both the one or more conductive segments and the one or more touch sensors 1410.

In addition, in some alternative examples, note that the one or more conductive segments are not provided any signals provided from any of the DSCs 28. For example, in such examples, the one or more conductive segments is/are not electrically connected to anything, are grounded, or are connected to some desired voltage such as a power supply, etc. Note that the one or more conductive segments may be implemented passively or operated actively in various embodiments.

FIG. 14B is a schematic block diagram of an embodiment 1402 of a computing device that includes one or more touch sensors in accordance with the present invention. This diagram has some similarities to the previous diagram with at least one difference being that it does not specifically include implement DSCs between one or more processing modules 1430 the one or more touch sensors 1410 and the one or more conductive segments of the common portion. Again, note that the common portion may or may not be an active element. In this diagram, one or more touch sensor processing modules 1499, that may include memory and/or be coupled to memory, is operative to facilitate touch sensor operation of the computing device using the one or more touch sensors 1410. In some examples, the one or more touch sensor processing modules 1499 is also configured to operate and interact with one or more conductive segments of the common portion. In alternative examples, note that the one or more conductive segments of the common portion do not interact with the one or more touch sensor processing modules 1499. Note that the one or more touch sensor processing modules 1499 is operative to perform touch sensor controller operations including analog-to-digital (A/D) and digital-to-analog (D/A) conversion of signals provided to and received from the one or more touch sensors 1410 in accordance with touch sensor operation. For example, the one or more touch sensor processing modules 1499 may be implemented in accordance with a switched capacitive method of operation. Generally speaking, the one or more touch sensor processing modules 1499 may be of any of a variety of types that facilitate touch sensor operation using the one or more touch sensors 1410.

(e.g., may be grounded, may be connected to DSC(s) that interface with a touch sensor processing module, may be coupled to one or more touch sensor processing module that is implemented in an architecture that does not employ any DSCs, etc. such as with respect to FIG. 14B).

Figure 15A:
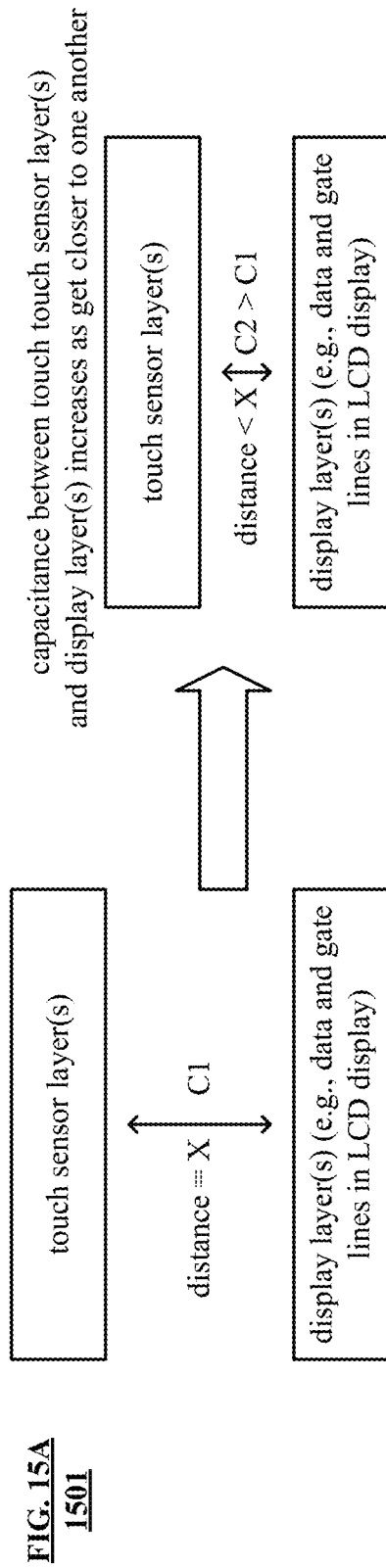
FIG. 15A is a schematic block diagram of an embodiment of increasing capacitance between one or more touch sensor layers and one or more display layers within a computing device that includes both touch sensor and display functionality in accordance with the present invention.

FIG. 15A is a schematic block diagram of an embodiment 1501 of increasing capacitance between one or more touch sensor layers and one or more display layers within a computing device that includes both touch sensor and display functionality in accordance with the present invention. Within certain devices that includes both touch sensor capability and display capability, there are one or more touch sensor layers and one or more display layers. For example, considering a device that includes a liquid crystal display (LCD) discipline, there will be one or more display layers to effectuate the display operation. Such layers may include data and gate lines that are implemented to operate the respective transistors that control the alignment of the liquid crystals to facilitate which colors and intensities of light are allowed to pass through and be output via the display. In addition, one or more touch sensor layers are implemented to facilitate touch sensor interactivity with the device. In some examples, the one or more touch sensors sensor layers are limited using a transparent material having conductive properties (e.g., indium tin oxide (ITO) or some other appropriately selected material).

Within the device, there will be a capacitance (e.g., C1) inherent to the device that is a function of these respective layers and the distance (e.g., consider X, which may be less than an inch, less than a quarter of an inch, etc.) by which they are separated. Within certain devices, as the distance decreases as the one or more touch sensor layers are implemented within the device closer to the one or more display layers (e.g., consider separated by a distance of X2 that is less than X1), the capacitance inherent to the device that is a function of these respective layers, C2, will be greater than when those layers are farther apart (e.g., C2>C1).

In general, the capacitance between the one or more touch sensor layers and the one or more display layers increases as they get closer to one another. This increased capacitance can be problematic within devices that include touch sensor capability. For example, the additional capacitance created as these layers become closer to one another can adversely affect operation of the touch sensor functionality within the device. For example, various deleterious effects may include false touch detection, inaccurate touch detection, erroneous touch detection, slow response time to actual touch detection, etc. In general, note that other operations and functionality supported by the touch sensor functionality such as proximity detection, hover detection, gesture detection, etc. may all also suffer adversely when there is increased capacitance between the one or more touch sensor layers in the one or more display layers.

Note that different respective devices that include touch sensors may be implemented in a variety of ways. In some examples, one or more touch sensors are implemented within a single layer such that the one or more touch sensors are coplanar. In addition, with respect to the various aspects, embodiments, and/or examples of the invention (and/or their equivalents) as described herein that include one or more touch sensors and one or more common segments, in certainties and polls, the different respective elements may be implemented within a single layer such that the one or more touch sensors and the one or more common segments are coplanar.

However, in other examples, one or more touch sensors are implemented within one or more touch sensor layers. In other examples, different respective touch sensors are implemented within different layers, such as one or more row touch sensors being implemented within one layer, and one or more column touch sensors being implemented within another layer. In even other examples, different respective touch sensors are implemented within different layers, such as a first touch sensor being implemented within the first layer, a second touch sensor being implemented within a second layer, assert that sensor being implemented within a third layer, and so on. In addition, with respect to the various aspects, embodiments, and/or examples of the invention (and/or their equivalents) as described herein that include one or more touch sensors and one or more common segments, the different respective elements may be implemented within different layers.

Various diagrams are provided and described below showing different respective ways in which one or more touch sensor segments and one or more common segments may be implemented within a device. Note that two or more respective segments may be electrically coupled together (e.g., using metals lines and vias, such as two touch sensor segments being electrically coupled, and/or two common segments being electrically coupled). For example, when one or more touch sensor segments and one or more common segments are implemented within the same level, metals lines and vias are used to connect certain of the respective segments in accordance with any desired pattern such as rows, columns, and/or any other desired pattern, etc. For example, metal lines that are implemented for electrically connecting one or more touch sensor segments that correspond to rows are included in one plane, other metal lines that are implemented for electrically connecting one or more touch sensor segments that correspond to columns are included in another plane.

FIG. 15B is a schematic block diagram of an embodiment 1502 of various layers within a touchscreen display being implemented on a same plane. This diagram shows one or more touch sensor segments and one or more common segments being implemented within the same plane such that they are all coplanar.

FIG. 15C is a schematic block diagram of an embodiment 1503 of various layers within a touchscreen display being implemented within more than one plane. This diagram shows one or more touch sensor segments being implemented on a first layer, and one or more common segments being implemented on a second layer that is lower than the first layer. Note that converse may alternatively be implemented such that the one or more touch sensor segments are implemented on a layer that is lower than the layer within which the one or more common segments are implemented.

FIG. 15D is a schematic block diagram of another embodiment 1504 of various layers within a touchscreen display being implemented within more than one plane. This diagram shows one or more touch sensor segments being implemented on the first layer, one or more other touch sensor segments being implemented on the second layer, and one or more common segments being implemented on a third layer.

FIG. 15E is a schematic block diagram of another embodiment 1505 of various layers within a touchscreen display being implemented within more than one plane. This diagram shows one or more touch sensor segments being implemented on the first layer, one or more other touch sensor segments being implemented on the second layer, and one or more common segments being implemented on a third layer, and one or more other common segments being implemented on a fourth layer.

Generally speaking, note that any number of respective segments of conductive material, whether being implemented as one or more touch sensor segments and/or one or more common segments, may be implemented on one or more layers. Within a multiple layer implementation, the different respective segments of conductive material may be implemented in accordance with any desired arrangement, hierarchy, architecture, etc.

This disclosure presents various novel implementations that effectuate a reduction in the total capacitance for the touch sensor thereby improving its performance. For example, considering a device that includes a layer having a conductive material, that conductive material is partitioned, and divided, arranged, etc. into different respective regions such that some of those regions are implemented for touch sensor functionality and other of those regions are implemented for one or more other uses. In some examples, note that the other regions are implemented to effectuate one or more other sensing systems, which may include a touch sensor system, a proximity detection system, a hover detection system, and/or a gesture detection system. However, in other examples, note also that the other regions are not specifically implemented to effectuate any sensing system, and they operate to improve the performance of the device by reducing the overall capacitance of the touch sensor.

In general, with respect to the one or more conductive layers that is implemented to effectuate the one or more touch sensors, not all of the conductive material is implemented for the one or more touch sensors. For example, considering a conductive plane within the device, some of the conductive material is implemented to effectuate rows and columns of a touch sensor device, and at least some other portion of the conductive material is not implemented specifically to effectuate the touch sensor device. The remaining conductive material that is not implemented to effectuate the touch sensor device may be implemented in a variety of ways. Considering one example, all of the remaining material may remain connected together as one conductive portion (e.g., a common ground plane, which may be implemented in a variety of ways including not connected to anything, connected to a DSC, connected to ground, connected to a known signal such as a power supply, etc.).

Considering another example, the remaining material may itself be partitioned into different respective conductive segments, and those different respective conductive segments may be implemented in a variety of ways. For example, the different respective conductive segments may be respectively connected to DSCs (e.g., a first DSC connected to a first conductive segment, a second DSC connected to a second conductive segment, etc.). In other examples, some of the conductive segments may be connected to DSCs, and other of the conductive segments may be connected to ground. In even other examples, some of the conductive segments may be connected to one or more known signals such as one or more power supplies. In general, any desired combination of connectivity of the different respective conductive segments may be implemented as desired with any particular application.

In addition, note that such implementations may also be made with respect to devices in which the one or more conductive layer is composed of multiple levels (e.g., not all in the same plane). For example, the one or more touch sensors may be implemented in a first one or more levels (e.g., one or more touch sensors all in the same plane, or alternatively a first touch sensor in a first level and a second touch sensor in a second level), and the one or more conductive segments of the common portion may be implemented in a second one or more levels (e.g., one or more conductive segments of the common portion all in the same plane, or alternatively or alternatively a first conductive segment of the common portion in a third level and a second conductive segment of the common portion in a second level).

FIG. 16 is a schematic block diagram of an embodiment 1600 of another patterned layer within a computing device that includes one or more touch sensors in accordance with the present invention. This diagram shows an embedded touch sensor implemented using touch sensor rows in touch sensor columns. A patterned layer (e.g., composed of ITO) is partitioned into different respective segments. This diagram shows conductive layer that is patterned into different respective segments including three different components. Some of the conductive material (e.g., the inner segments of the square patterns) are connected to effectuate touch sensor rows (e.g., connected together using metal lines and vias), some of the conductive material (e.g., the outer segments of the square patterns) are connected to effectuate touch sensor columns, and the remaining conductive material is implemented as a common. Note that the common portion may or may not be an active element (e.g., may be grounded, may be connected to DSC(s) that interface with a touch sensor processing module, may be coupled to a touch sensor processing module that is implemented in an architecture that does not employ any DSCs, etc. such as with respect to FIG. 14B). In some examples, the common is implemented as a ground plane (e.g., such as when the common portion is electrically connected to ground). In other examples, the common may be viewed as one or more active sensing elements (e.g., such as when the common portion includes one or more conductive segments that are electrically connected to one or more components such as one or more DSCs that interface with a touch sensor processing module or coupled to a touch sensor processing module that is implemented in an architecture that does not employ any DSCs, etc. such as with respect to FIG. 14B).

In some examples, the different respective segments for the three different components (e.g., square segments for columns, segments around the square segments for rows, and common) are all included in the same layer. Also, there are additional layers for the respective metal lines and vias that connect the conductive segments in the desired pattern. For example, two additional layers are implemented such that a first set of metal lines are implemented for the columns (e.g., parallel to data lines), and a second set of metal lines are implemented for the rows (e.g., parallel to the gate lines), or vice versa. In such an example, there are 3 conductive layers depicted with respect to this diagram. For example, a first layer corresponds to the conductive layer that includes the one or more touch sensor segments and the one or more common portion segments, a second layer corresponds to the conductive layer that includes the first set of metal lines that are implemented for the rows, and a third layer corresponds to the conductive layer that includes the second set of metal lines that are implemented for the columns. Alternatively, the second layer corresponds to the conductive layer that includes a first set of metal lines that are implemented for the columns, and a third layer corresponds to the conductive layer that includes a second set of metal lines that are implemented for the rows.

In some examples, the common occupies approximately 50% of the surface area of the layer, and the rows and columns of the touch sensor occupy approximately 50% of the surface area the layer. In other examples, the common occupies more than 50% of the surface area of the layer, and the and the rows and columns of the touch sensor occupy less than 50% of the surface area the layer. In even other examples, the common occupies less than 50% of the surface area of the layer, and the and the rows and columns of the touch sensor occupy more than 50% of the surface area the layer. In general, any desired distribution between the common and the and the rows and columns of the touch sensor may be implemented as desired within a particular application.

As can be seen in this diagram, the conductive material of this plane includes a number of square shaped segments (inner segments) that are surrounded by an outer segments. This pattern is repeated within the layer. The inner segments are connected together appropriately to effectuate the touch sensor columns, and the inner segments are grouped into columns of three and connected together to form the respective touch sensor columns. For example, a first touch sensor column is implemented using the inner segments of three respective columns, and an n-th touch sensor column is implemented using the inner segments of three respective columns.

Similarly, the outer segments are connected together appropriately to effectuate the touch sensor rows, and the powder segments are grouped into rows of three and connected together to form the respective touch sensor rows. For example, a first touch sensor row is implemented using the outer segments of three respective columns, and an m-th touch sensor column is implemented using the inner segments of three respective columns. Note that the touch sensor may include any desired number of rows and columns, m and n, such that m and n are positive integers greater than or equal to 1.

Also, note that any number of columns and rows may be used to implement the respective touch sensor rows and touch sensor columns. For example, each of the touch sensor rows may be implement it using the outer segments of four respective rows, and each of the touch sensor columns may be implemented using the outer segments of four respective columns. Alternative, each of the touch sensor rows may be implement it using the outer segments of five respective rows, and each of the touch sensor columns may be implemented using the outer segments of five respective columns. In addition, note that the number of inner segments and outer segments with respect to columns and rows of the conductive materials may be different (e.g., each of the touch sensor rows may be implement it using the outer segments of three respective rows, and each of the touch sensor columns may be implemented using the outer segments of four respective columns). Also, the respective touch sensor rows and columns need not include a uniformed number of rows and columns of conductive material (e.g., a first touch sensor row may include outer segments of two respective rows, a second touch sensor row may include outer segments of three respective rows, etc., and a first touch sensor column may include inner segments of four respective columns, a second touch sensor column may include inner segments of five respective rows). In general, any desired number of inner segments and outer segments may be grouped together to form the respective touch sensor rows and columns. This principle may also be extended to other designs implemented using different patterns and shapes as well.

Note that in this diagram as well as others described herein and their equivalents, the touch sensor rows and columns may be implemented in a fashion alternative to what is shown. For example, in an alternative implementation with respect to this diagram, the touch sensor rows could alternatively be implemented using the inner segments, and the touch sensor columns could alternatively be implemented using the outer segments. In other examples as provided herein, no that those elements that are implemented for rows and other elements that are implemented for columns could be transposed without departing from the scope and spirit of the invention.

In general, with respect to any diagram shown herein and their equivalents, the row and column implementations may be flipped. In addition, note that alternative touch sensor implementations other than row and column may be used (e.g., touch sensors not implemented specifically in parallel arranged rows and columns, such as implemented diagonally across the touch screen in such a manner as to provide location determination, e.g., electrodes extending from upper left to lower right, and other electrodes extending from lower left to upper right). For example, the touch sensor functionality may be implemented to provide buttons (e.g., such that a given conductive element of the layer detects or does not detect user interaction), sliders (e.g., a group of sensors), etc.

The common operates to reduce the overall capacitance of the sensor. As described above, as the touch sensor layer is implemented closer and closer to the one or more display internals of a device having both touch sensor functionality in display functionality (e.g., as the touch plane gets closer and closer to one or more other display layers and/or a backplane within the device), the capacitance between the touch plane and those one or more other display layers and/or the backplane becomes greater. For example, the different respective layers within such a display are extremely thin, and the capacitance can increase significantly between them as they get closer and closer together.

For example, the data and gate lines implemented to operate the display elements of the device have increased capacitance. In addition, other layers and components behind the one or more other display layers and/or the backplane may suffer adversely from other effects such as other capacitive coupling, noise injection, etc. The common operates to reduce the overall capacitance. In addition, the corner frequencies associated with the device (e.g., associated with the RC time constant that is based on the resistance and capacitance of the elements within the device are pushed up to higher frequencies. As such, more frequencies are made available for use within the touch sensor functionality and/or the display functionality of the device.

Moreover, by reducing the overall capacitance of the touch sensor within a device that includes both touch sensor and display functionality, much larger screen devices may be implemented. For example, the prior art does not provide adequate means by which very large screen display/touch sensor devices may be implemented while providing acceptable performance. By reducing the overall capacitance of the touch sensor, much larger architectures may be implemented. Also, this reduction in capacitance of the device allows for scaling up in size for in-cell architectures as well. In general, and in-cell architecture implements the touch sensor functionality using the hardware already implemented for the display functionality within the device.

In general, any remaining material in the conductive layer that is not implemented for touch sensor functionality (e.g., any remaining material that is not implemented for the rows and columns of the touch sensor such as in the implementation of this diagram) may be partitioned into one or more conductive segments (e.g., one or more common segments).

Those one or more conductive segments may be implemented in any of a variety of ways including being connected to nothing, being used as a common plane such as a current source, a common plane such as a power source, a common plane such as a voltage source, etc. or alternatively being connected respectively to different respective DSCs, different respective current sources, different respective power sources, etc.

In addition, while the one or more conductive segments operate to reduce the overall capacitance of the touch sensor, they may also be implemented for a variety of other reasons. It/they may be implemented to effectuate one or more additional touch sensors (e.g., having their own respective rows and columns). It/they may be implemented to effectuate a proximity detector (e.g., detecting when a user is within proximity of the device). It/they may be implemented to effectuate a hover detector (e.g., detecting when a user is placing a finger or hand over the touch sensor of the device). It/they may be implemented to effectuate a gesture sensor (e.g., including a sufficient number of us conductive segments to detect when a user is moving a finger or hand near to but not particularly touching the touch sensitive device).

In general, note that the conductive material may be patterned in any desired format. While this particular diagram shows squares (e.g., the inner segments) surrounded by conductive also having a square outer perimeter (e.g., the outer segments), know that the respective segments may be of any shape, size, etc. In addition, they may be of uniform or nonuniform size and shape. Note that they may also be of different shapes (e.g., square, diamond, triangle, rectangular, elliptical, circular, etc. and/or any combination of shapes).

In addition, certain of the following diagrams show alternative implementations by which the conductive layer is patterned to effectuate one or more touch sensors and one or more conductive segments. In any of the following diagrams, note that the conductive layer may be implemented as more than one conductive layer, such as described with respect to FIGS. 15C, 15D, 15E, etc.

Referring again to this diagram within FIG. 16, an example of operation and implementation may be made as follows, and similar operation and implementation may be made with respect to other diagrams included herein. For example, consider a system that provides different respective signals to the conductive segments that are used to implement touch sensor rows and touch sensor columns as well as the common portion. In some examples, a first signal is a self signal having a first frequency, and a second signal is in mutual signal having a second frequency. The different respective frequencies of the signals differentiate them between self and mutual. The mutual signal is used to facilitate coupling between a touch sensor row in the touch sensor column, such as to identify a particular location of a user interacting with the touchscreen.

In an example of operation and implementation, the self signal is simultaneously provided to the touch sensor rows, the touch sensor columns, and the common portion. However, the mutual signal is only provided to the touch sensor columns, and based on user interaction with one or more of the touch sensors, the mutual signal will be coupled from a touch sensor column to a touch sensor row thereby providing indication of a particular location of a user interacting with the touchscreen. For example, consider the upper left-hand corner that includes a center square that is implemented as part of touch sensor column 1 and that is surrounded by an outer box that is implement it as part of touch sensor row 1, then the cell signal would simultaneously be provided to the center square, the outer box, and also the common portion that surrounds the outer box. However, the mutual signal would be provided to the center square, and based on mutual coupling between the center square and the outer box, the mutual signal would be coupled from the center square to the outer box. There would be very little, if any, mutual coupling from the center square to the common portion.

FIG. 17 is a schematic block diagram of another embodiment 1700 of a patterned layer within a computing device that includes one or more touch sensors in accordance with the present invention. This diagram has some similarities to the previous diagram, with at least one difference being that the conductive segments associated with the touch sensor rows and columns are implemented using vertically aligned rectangular shapes that are adjacently located. For example, the conductive material is patterned into squares that include left-handed segments and right-handed segments. The touch sensor columns are implemented using the left-handed segments (e.g., connected together using metal lines and vias, and using three respective columns to implement a touch sensor column), and the touch sensor rows are implemented using the right-handed segments (e.g., connected together using metal lines and vias, and using three respective rows to implement a touch sensor row).

FIG. 18 is a schematic block diagram of another embodiment 1800 of a patterned layer within a computing device that includes one or more touch sensors in accordance with the present invention. This diagram also has some similarities to previous diagrams, with at least one difference being that the conductive segments associated with the touch sensor rows and columns are implemented using horizontally aligned rectangular shapes that are adjacently located. In addition, the bottom rectangular portion of a first square and the top rectangular portion of a second square located below the first square are connected together to effectuate a touch sensor role or touch sensor column. Note that the conductive material is patterned to squares that include top and bottom segments. The respective touch sensor rows in touch sensor columns are then effectuated by electrically connecting the first alternating top/bottom segments and second alternating top/bottom segments.

As can be seen in the diagram, considering the top row of squares, each respective square therein includes a top segment and a bottom segment. Considering the row of squares at adjacently located below the top row of squares, each respective square therein also includes a top segment and the bottom segment. Note that the bottom segments of the top rope squares are electrically connected to the top segment of the row of squares adjacently located below the top rope squares. This alternating implementation is made to effectuate both the touch sensor rows in touch sensor columns. In this particular example, four respective rows of first alternating top/bottom segments are shown as implementing a touch sensor row 1. Also, three respective columns of second alternating top/bottom segments are shown as implementing a touch sensor column 1.

Generally speaking, note that any pattern may be used to implement different respective touch sensor rows and columns in accordance with the principles as described herein. In addition, note that the common may also be partitioned, subdivided, patterned, into different respective conductive segments.

Certain implementations may be viewed, at least in part, with respect to the architecture shown with respect to FIG. 14.

In an example of operation and implementation, a touchscreen display includes one or more conductive layers that is implemented for a touch sensor (e.g., touch sensors 1410 of FIG. 14) and a common portion (e.g., one or more conductors of the common ground plane that are formed by electrically connected one or more respective conductive segments). Note that the common portion may also be partitioned into more than one portion. Note that the touch sensor includes a first conductor that is composed of a first plurality of segments that are electrically connected and a second conductor composed of a second plurality of segments that are electrically connected. Note that the segments may be of any desired shape, size, orientation, etc. Also, the common portion may be viewed as being a third conductor when not further partitioned into multiple respective portions.

In some examples, the common portion that includes the third conductor is one portion of the one or more conductive layers. In other examples, the common portion is partitioned into the third conductor is a first portion of the one or more conductive layers, a fourth conductor is a second portion of the one or more conductive layers. In even other examples, the common portion is partitioned into the third conductor is a first portion of the one or more conductive layers, a fourth conductor is a second portion of the one or more conductive layers, a fifth conductor is a third portion of the one or more conductive layers, and so on for all of the respective conductors that are included within the common portion of the one or more conductive layers. Regardless of the particular implementation, note that the first conductor, the second conductor, and the third conductor are located in a common plane within the touchscreen display.

The touchscreen display also includes a first drive-sense circuit (DSC) operably coupled to generate a first signal based on a first reference signal. When enabled, the first DSC is operably coupled and configured to provide the first signal to the first conductor via a first single line and simultaneously to sense the first signal via the first single line, wherein sensing of the first signal includes detection of a first electrical characteristic of the first signal. The first DSC is also operably coupled and configured to generate a first digital signal representative of the first electrical characteristic of the first signal.

The touchscreen display also includes a second DSC operably coupled to generate a second signal based on a second reference signal. When enabled, the second DSC is operably coupled and configured to provide the second signal to the second conductor via a second single line and simultaneously to sense the second signal via the second single line, wherein sensing of the second signal includes detection of a second electrical characteristic of the second signal. The second DSC is also operably coupled and configured to generate a second digital signal representative of the second electrical characteristic of the second signal.

The touchscreen display also includes memory that stores operational instructions and one or more processing modules (e.g., one or more processing modules 1410) operably coupled to the first DSC, the second DSC, and the memory. When enabled, the one or more processing modules is configured to execute the operational instructions to process the first digital signal to determine the first electrical characteristic of the first signal and process the second digital signal to determine the second electrical characteristic of the second signal. The is also configured to execute the operational instructions to process the first electrical characteristic of the first signal and the second electrical characteristic of the second signal to detect interaction of a user with the touch sensor.

In some examples, the touchscreen display also includes a third DSC operably coupled to generate a third signal based on a third reference signal. When enabled, the third DSC operably is coupled and configured to provide the third signal to the third conductor via a third single line and simultaneously to sense the third signal via the third single line. Note that sensing of the third signal includes detection of a third electrical characteristic of the third signal. This third DSC is also configured to generate a third digital signal representative of the third electrical characteristic of the third signal and to process the third electrical characteristic of the third signal to detect presence of the user within a detectable proximity of the touchscreen display.

Also, in certain examples including this particular implementation of a touchscreen display and/or other implementations, when enabled, the one or more processing modules is configured to execute the operational instructions to operate the touchscreen display based on a first power mode before detection of the presence of the user within the detectable proximity of the touchscreen display and also to operate the touchscreen display based on a second power mode that is different than the first power mode after detection of the presence of the user within the detectable proximity of the touchscreen display. Some particular methods for execution by one or more devices in accordance with the present invention that also relate to such selective power mode operation are described with reference to FIG. 24 and FIG. 25 as well.

In even other examples including this particular implementation of a touchscreen display and/or other implementations, when enabled, the one or more processing modules is configured, after detection of presence of the user within the detectable proximity of the touchscreen display, to execute the operational instructions to process the first electrical characteristic of the first signal and the second electrical characteristic of the second signal to detect other interaction of the user with the touch sensor. Then, based on no detection of the other interaction of the user with the touch sensor, the one or more processing modules is configured to execute the operational instructions to process the third electrical characteristic of the third signal to detect other presence of the user within the detectable proximity of the touchscreen display. Also, based on no detection of the other presence of the user within the detectable proximity of the touchscreen display, the one or more processing modules is configured to execute the operational instructions to operate the touchscreen display based on the first power mode.

In some particular examples including this particular implementation of a touchscreen display and/or other implementations, note that the first power mode is a lower power mode than the second power mode. Also, the touch sensor is turned off for at least some time during operation of the touchscreen display within the first power mode.

In yet other examples including this particular implementation of a touchscreen display and/or other implementations, the touchscreen display includes a fourth conductor and a third DSC operably coupled to generate a third signal based on a third reference signal. When enabled, the third DSC is operably coupled and configured to provide the third signal to the third conductor via a third single line and simultaneously to sense the third signal via the third single line, wherein sensing of the third signal includes detection of a third electrical characteristic of the third signal. The third DSC is also configured to generate a third digital signal representative of the third electrical characteristic of the third signal.

The touchscreen display also includes a fourth DSC operably coupled to generate a fourth signal based on a fourth reference signal. When enabled, the fourth DSC is operably coupled and configured to provide the fourth signal to the fourth conductor via a fourth single line and simultaneously to sense the fourth signal via the fourth single line, wherein sensing of the fourth signal includes detection of a fourth electrical characteristic of the fourth signal and to generate a fourth digital signal representative of the fourth electrical characteristic of the fourth signal. In such examples, when enabled, the one or more processing modules is configured to execute the operational instructions to process the third electrical characteristic of the third signal and the fourth electrical characteristic of the fourth signal to detect a gesture made by the user based on the user being within a detectable proximity of the touchscreen display and interacting with the third conductor and the fourth conductor differently at different times. Some particular examples related to gesture detection are described with reference to FIG. 23 as well.

In some examples, including this particular implementation of a touchscreen display and/or other implementations, note that the touch sensor and the common portion each respectively occupy a same amount of the one or more conductive layers. For example, the one or more conductive segments that form the respective first conductor and second conductor (e.g., any additional conductors) occupy approximately 50% of the area of the layer, and the touchscreen (e.g., the one or more touch sensors 1410) occupy approximately 50% of the layer. In other examples, the one or more conductive segments occupies more than 50% of the area of the layer, and the one or more touch sensors 1410 occupy less than 50% of the layer.

Is some particular examples including this particular implementation of a touchscreen display and/or other implementations (e.g., within a common plane within the touchscreen display or within different planes of the touchscreen display), a first segment of the first plurality of segments of the first conductor is surrounded by a first segment of the second plurality of segments of the second conductor, and the first segment of the second plurality of segments of the second conductor is surrounded by a portion of the third conductor. Such examples may be found at least with reference to FIG. 16, FIG. 19, FIG. 20.

Is some other particular examples including this particular implementation of a touchscreen display and/or other implementations (e.g., within a common plane within the touchscreen display or within different planes of the touchscreen display), a first segment of the first plurality of segments of the first conductor and a first segment of the second plurality of segments of the second conductor are adjacently located within an area of the one or more conductive layers, and a portion of the third conductor surrounds the area of the one or more conductive layers. Such examples may be found at least with reference to FIG. 17, FIG. 18. Note that the directionality, alignment, etc. of the segments that are adjacently located may be in any desired direction. In certain examples, such pairs of segments include segments of approximately or substantially same size (e.g., within 5%, 10%, etc. same size of one another). For example, in FIG. 17 and FIG. 18, the respective segments for touch sensor row 1 that are adjacently located to segments for touch sensor column 1 are of approximately or substantially same size. However, note that they may be of different size in other examples. For example, the respective segments for touch sensor row 1 that are adjacently located to segments for touch sensor column 1 are larger or smaller than the segments for touch sensor column 1.

Also, with respect to any implementation of touch sensors (e.g., rows and columns) of a touchscreen display including this particular implementation of a touchscreen display and/or other implementations, note that the first conductor is aligned in a first direction, and the second conductor is aligned in a second direction that is different than the first direction.

FIG. 19 is a schematic block diagram of another embodiment 1900 of a patterned layer within a computing device that includes one or more touch sensors in accordance with the present invention. This diagram shows some similarities to previous diagrams (e.g., FIG. 16) with at least one difference being that the common is divided into different respective segments. The common includes a common 1 (e.g., a ground plane or active segment 1), and up to common x (e.g., a ground plane or active segment x), where x is a positive integer greater than or equal to 2.

This diagram shows the different respective common segments as having outer perimeters that are vertically arranged rectangles and that are implemented using the conductive material arranged around certain segments used for the rows and columns of the touch sensor.

With respect to this diagram and any other that that includes more than one common segment, note that proximity may be detected with respect to any one common segment. Gesture detection, with respect to the multiple common segments, may be detected based on proximity detection across more than one of the common sections as a function of time. For example, in this diagram, consider that a user is moving a hand from left to right above or near the touch screen. Based on proximity detection of that hand with respect to the different, and segments from left to right as a function of time, then a gesture of the user moving a hand from left to right above or near the touch screen may be detected.

FIG. 20 is a schematic block diagram of another embodiment 2000 of a patterned layer within a computing device that includes one or more touch sensors in accordance with the present invention. This diagram also shows some similarities to previous diagrams (e.g., FIG. 16) with at least one difference being that the common is divided into different respective segments. The common portion includes a common 1 (e.g., a ground plane or active segment 1), and up to common x (e.g., a ground plane or active segment x), where x is a positive integer greater than or equal to 2.

This diagram shows the different respective common segments as having outer perimeters that are squared shapes and that are implemented using the conductive material arranged around certain segments used for the rows and columns of the touch sensor. In comparing this diagram to the previous diagram, this implementation could provide approximately twice the granularity with respect to the common segments as the prior diagram.

In some examples, note that the different respective common segments implemented in any of a variety of ways including being connected to nothing, being used as a common plane such as a current source, a common plane such as a power source, a common plane such as a voltage source, etc. or alternatively being connected respectively to different respective DSCs, different respective current sources, different respective power sources, etc.

In an example of operation and implementation, considering and implementation in which each of the respective common segments is connected to a different respective DSC, they may be operated and driven independently.

As described with respect to the patterning for the different respective conductive segments implemented to effectuate the touch sensor rows in touch sensor columns, note that the common segments may also be implemented in any desired manner. The different respective, and segments may be of uniform or nonuniform size and shape. Note that they may also be of different shapes (e.g., square, diamond, triangle, rectangular, elliptical, circular, etc. and/or any combination of shapes).

In yet another example of operation and implementation, a touchscreen display includes a conductive layer that is implemented for a touch sensor (e.g., touch sensors 1410 of FIG. 14) and a common portion (e.g., one or more conductors of the common ground plane that are formed by electrically connected one or more respective conductive segments). For example, the one or more conductive layers is implemented for a touch sensor and a common portion such that the common portion includes a first conductor and the touch sensor includes a second conductor composed of a plurality of segments that are electrically connected. In some examples, note that the first conductor and the second conductor are located in a common plane within the touchscreen display. In other examples, note that the first conductor and the second conductor are located in different plane within the touchscreen display.

The touchscreen display also includes a first drive-sense circuit (DSC) operably coupled to generate a first signal based on a first reference signal. When enabled, the first DSC is operably coupled and configured to provide the first signal to the first conductor via a first single line and simultaneously to sense the first signal via the first single line, wherein sensing of the first signal includes detection of a first electrical characteristic of the first signal. The first DSC is also configured to generate a first digital signal representative of the first electrical characteristic of the first signal.

The touchscreen display also includes a second DSC operably coupled to generate a second signal based on a second reference signal. When enabled, the second DSC is operably coupled and configured to provide the second signal to the second conductor via a second single line and simultaneously to sense the second signal via the second single line, wherein sensing of the second signal includes detection of a second electrical characteristic of the second signal. The second DSC is also configured to generate a second digital signal representative of the second electrical characteristic of the second signal.

The touchscreen display also includes memory that stores operational instructions and one or more processing modules operably coupled to the first DSC, the second DSC, and the memory. When enabled, the one or more processing modules is configured to execute the operational instructions to process the first digital signal to determine the first electrical characteristic of the first signal and to process the first electrical characteristic of the first signal to detect presence of a user within a detectable proximity of the touchscreen display. In addition, the one or more processing modules is configured to execute the operational instructions to process the second digital signal to determine the second electrical characteristic of the second signal and to process the second electrical characteristic of the second signal to detect interaction of the user with the touch sensor.

In certain examples, the touch sensor also includes a third conductor composed of another plurality of segments that are electrically connected. The touchscreen display also includes a third DSC operably coupled to generate a third signal based on a third reference signal. When enabled, the third DSC is operably coupled and configured to provide the third signal to the third conductor via a third single line and simultaneously to sense the third signal via the third single line. Note that sensing of the third signal includes detection of a third electrical characteristic of the third signal and to generate a third digital signal representative of the third electrical characteristic of the third signal. The third DSC is also configured to process the second electrical characteristic of the second signal and the third electrical characteristic of the third signal to detect the interaction of the user with the touch sensor including a location of the detect interaction of the user with the touch sensor.

Figure 21:
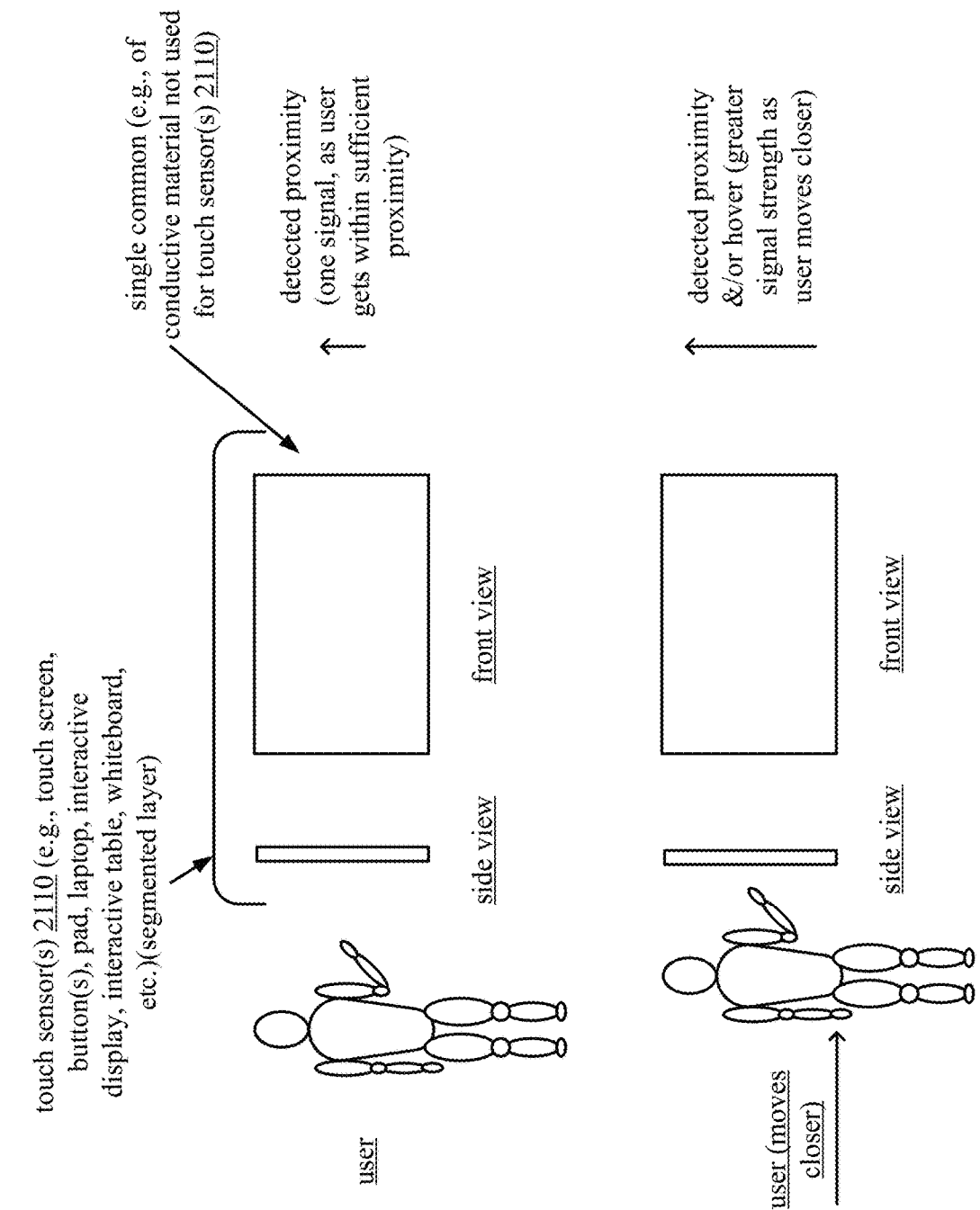
FIG. 21 is a schematic block diagram of an embodiment of user interaction with a computing device that includes one or more touch sensors in accordance with the present invention.

FIG. 21 is a schematic block diagram of an embodiment 2100 of user interaction with a computing device that includes one or more touch sensors in accordance with the present invention. This diagram shows a user interacting with a device that includes one or more touch sensors 2110 (not specifically shown in the diagram). As described above with respect to other embodiments and examples, note that the one or more touch sensors 2110 may be implemented in any of a variety of types of devices. Examples of such devices may include a touch screen, a pad device, a laptop, an interactive display, an interactive table, a whiteboard, a smartphone, tablet device, etc. Note also that such a device that includes the one or more touch sensors 2110 may be of any of a variety of sizes such as being a handheld type device such as a smart phone, a tablet device, pad device, etc.

In this implementation, the device that includes the one or more touch sensors 2110 also includes a single common portion that is composed of the conductive material that is not implemented for use by the one or more touch sensors 2110. For example, consider FIG. 16, 17, or 18 above, a single common is implemented based on the conductive material that is not implemented for use by the one or more touch sensors 2110.

As the user interacts with the device including as the user approaches the device, the device is configured to detect presence of the user. For example, a detected proximity having a relatively small signal will be detected as the user gets with insufficient proximity to be detected by the device. As the user moves closer, the signal associated with the detected proximity will increase in strength. In an example of operation and implementation, if the user places a hand near but not touching a touch screen that includes the one or more touch sensors 2110, the device will be able to detect the presence of the user by appropriately using the common.

For example, one or more processing modules is implemented to provide one or more signals via one or more DSCs to the common of the device. As the user is within sufficient proximity of the device to be detected, the one or more processing modules is configured to process the one or more signals provided from the one or more DSCs to determine the presence of the user. As the user moves closer to the touch screen that includes the one or more touch sensors 2110, the one or more processing modules is implemented to determine that the user has moved closer based on change of the one or more signals associated with the one or more DSCs to the common of the device.

Note that such proximity detection of a user with the device may be used for a variety of reasons. For example, the device may be implemented to operate in a particular operational mode (e.g., low power, power savings, etc. such that the one or more touch sensors 2110 are not operational until a user's presence is detected via the common). Then, once a user's presence is detected, the device is implemented to operate in another operational mode (e.g., full power, partial power, etc. such that the one or more touch sensors 2110 are operational to effectuate touch sensor functionality and capability).

Figure 22:
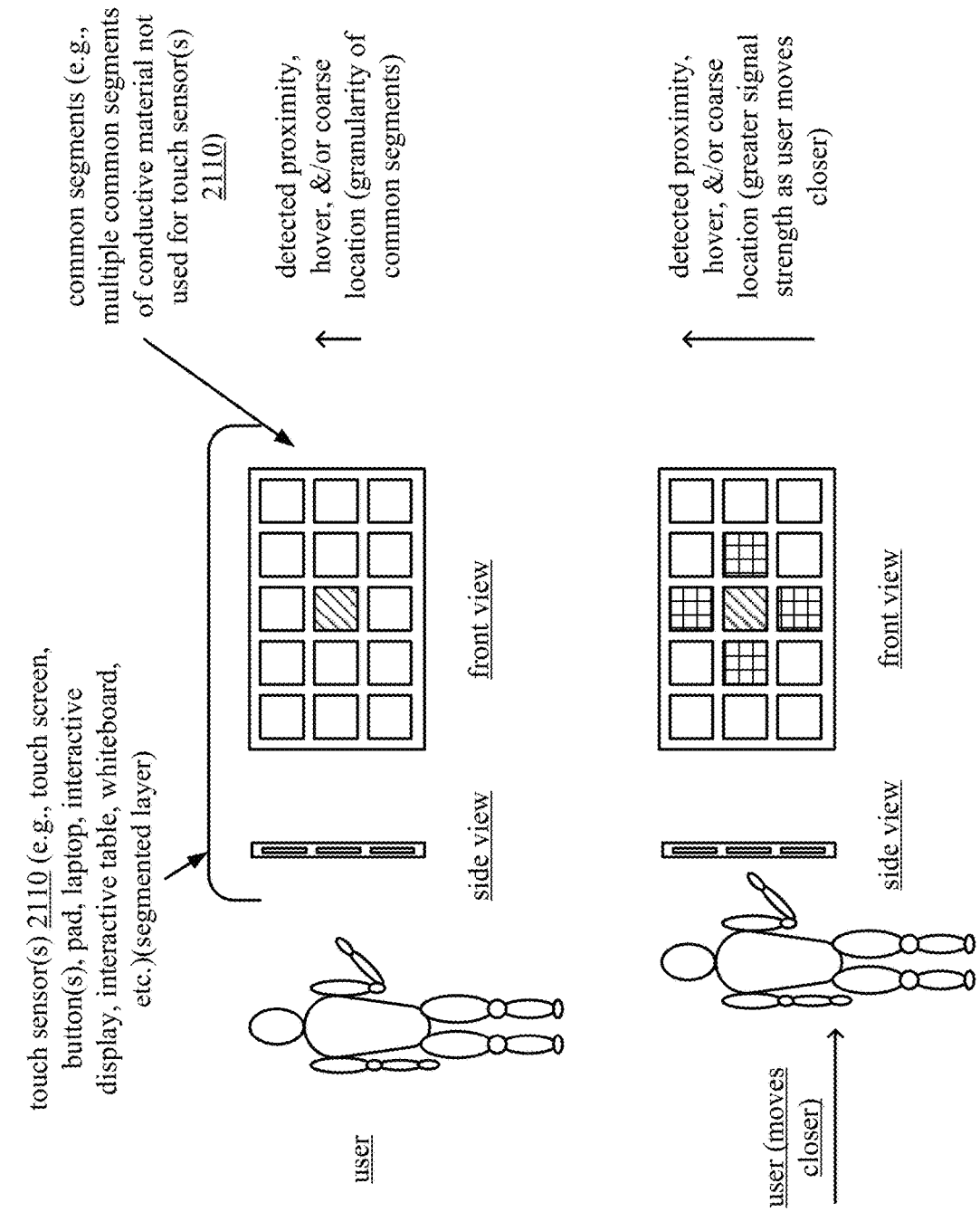
FIG. 22 is a schematic block diagram of another embodiment of user interaction with a computing device that includes one or more touch sensors in accordance with the present invention.

FIG. 22 is a schematic block diagram of another embodiment 2200 of user interaction with a computing device that includes one or more touch sensors in accordance with the present invention. In this diagram, the common is implemented to include a number of different respective common segments. Note that while the different respective common segments of conductive material are shown in this diagram as being of substantially or approximately the same size, in general, the different respective common segments of conductive material may be of any shape, size, etc. In addition, they may be of uniform or nonuniform size and shape. Note that they may also be of different shapes (e.g., square, diamond, triangle, rectangular, elliptical, circular, etc. and/or any combination of shapes).

In an example of operation and implementation, each of the respective common segments may be independently operated. For example, a different respective DSC is implemented to drive and sense a different respective signal provided to a respective common segment. For example, a first DSC is connected to a first common segment, a second DSC is connected to a second segment, etc.

The one or more processing modules is configured to process signals associated with the DSCs and the common segments to determine detected proximity, hover, and/or coarse location of the user with respect to the device. Note that the coarse location is based on the granularity of the common segments. The smaller the respective common segments, then the greater the granularity and specificity of location of the user interacting with the device. The larger the respective common segments, then the smaller the granularity and specificity of location of the user interacting with the device.

Also, similarly to how the signal strength associated with detection of user proximity and/or hover increased as the user moved closer to the touch screen in the prior diagram, note that the signal strength associated with detection of user proximity, hover, and/or coarse location associated with the respective common segments will similarly increase as the user moves closer to the touch screen in this diagram. Note also that there may be different signal levels with respect to the different respective common segments. For example, consider that a user is closer to a centrally located common segment in the bottom portion of the diagram, then the signal level associated with that common segment will be relatively larger than the signal levels associated with other common segments located around that centrally located common segment.

Figure 23:
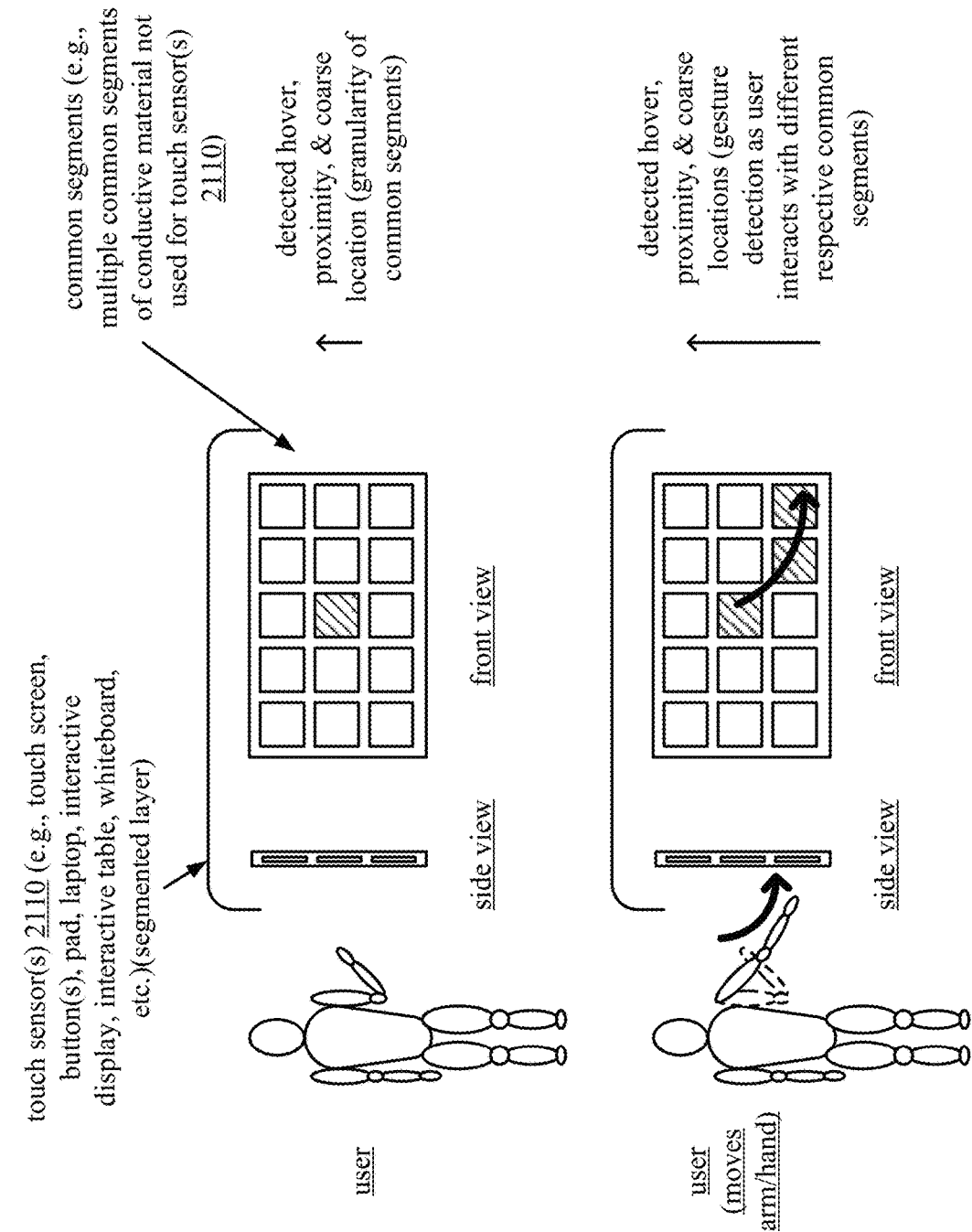
FIG. 23 is a schematic block diagram of another embodiment of user interaction with a computing device that includes one or more touch sensors in accordance with the present invention.

FIG. 23 is a schematic block diagram of another embodiment 2300 of user interaction with a computing device that includes one or more touch sensors in accordance with the present invention. The device of diagram has some similarities with the previous diagram, and this device also provides for gesture detection. For example, consider when a user moves and arm or hand any particular motion near the touch screen, but not touching the touch screen per se. Detection of these signals associated with the different respective common segments, as a function of time, is made to perform gesture detection as a user interacts with different respective common segments. Note that such gesture detection may be implemented differently and independently from touch sensor capability.

For example, one or more processing modules is configured to process signals associated with DSCs that are configured to drive and sense respective signals to the common segments to determine, as a function of time, what interactivity in terms of gesturing near the touch screen is being performed by the user. Note that such gesture detection and operation may be implemented or performed without the touch sensor functionality and capability being operable. For example, a gesture detection system and a touch sensor system may operate independently from one another. Note also that they may both operate concurrently as well, such that touch sensor detection may be performed by the device at the same time that the gesture detection is being performed by the device. Consider a user who is touching the touch screen with one hand while gesturing above or near the touch screen with the other hand.

In addition, note that two entirely independent gesture sensor systems may be implemented using subsets of the common segments. For example, considering a checkerboard implementation, then the first gesture sensor system may be implemented using a first subset of the common segments, and a second gesture system may be implemented using the second subset of the common segments.

In addition, with respect to such implementations of a device that includes one or more touch sensors in one or more common segments, the operation of the system may be viewed as facilitating three separate and distinct modes of operation and functionality that may be all performed concurrently or simultaneously. For example, using one or more common segments, a first mode of operation and functionality includes proximity and/or gesture detection they be performed. Such proximity and/or gesture detection using the one or more common segments may be performed relatively far from the device in comparison to touch detection (e.g., using one or more touch sensors that may be implemented based on rows and columns).

Also, a second mode of operation and functionality includes hover detection that is performed by the device closer to the device than proximity and/or gesture detection. In addition, a third mode of operation and functionality includes touch detection that is performed by the device closer to the device than both hover detection and proximity and/or gesture detection. For example, the one or more common segments can detect user interaction relatively farther away than the one or more touch sensors. In an example, proximity and/or gesture detection may be performed 12-18 inches away from the device using the one or more common segments, and touch detection may be performed based on a user being in contact with the device itself. From certain perspectives, there are at least three separate and distinct modes of operation and functionality that may be all performed concurrently or simultaneously.

Figure 24:
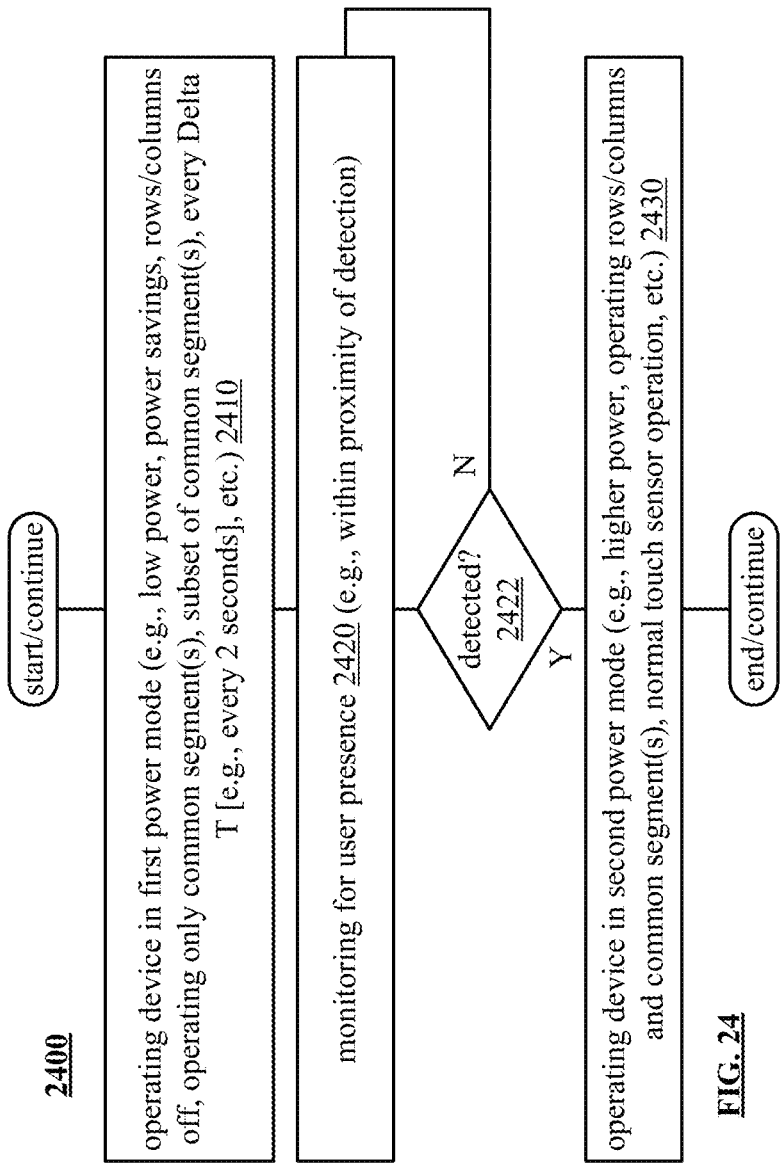
FIG. 24 is a schematic block diagram of an embodiment of a method for execution by one or more devices in accordance with the present invention.

FIG. 24 is a schematic block diagram of an embodiment of a method 2400 for execution by one or more devices in accordance with the present invention. The method 2400 operates in step 2410 by operating a device in a first mode. Note that the first mode may be a low-power mode, power savings mode, a mode in which the rows and columns of a touch sensor system are off, a mode in which only the one or more common segments of the device are operable, and mode in which one or more subsets of common segments are operable, a mode that is only operable intermittently such every certain period of time (e.g., every 1, 2, 3, or 5 seconds), etc.

The method 2400 operates in step 2420 by monitoring for user presence. This may be performed by performing proximity detection, and monitoring for whether or not a user is within sufficient proximity to be detected by the device. Based on user not being detected, such as when one or more of the signals associated with the one or more common segments compares unfavorably to a detection parameter (e.g., a detection signal being below a certain threshold), then the method 2400 loops back to the step 2420.

Alternatively, based on a user being detected, such as when the one or more of the signals associated with the one or more common segments compares favorably to a detection parameter (e.g., a detection signal being above a certain threshold), then the method 2400 continues to step 2435 operating the device and a second mode. Note that this second mode may be a high-power mode, a mode in which the rows and columns of the touch sensor system are operational, a mode operable to effectuate normal touch sensor operation, etc.

As can be seen, the method 2400 provides improvement of the operation of the device by performing power savings based on detection of a user within the proximity of the device. When a user is not proximately located to the device, then the touch sensor system functionality may be operated in an alternative power mode (e.g., low power, power savings, off, etc.).

Figure 25:
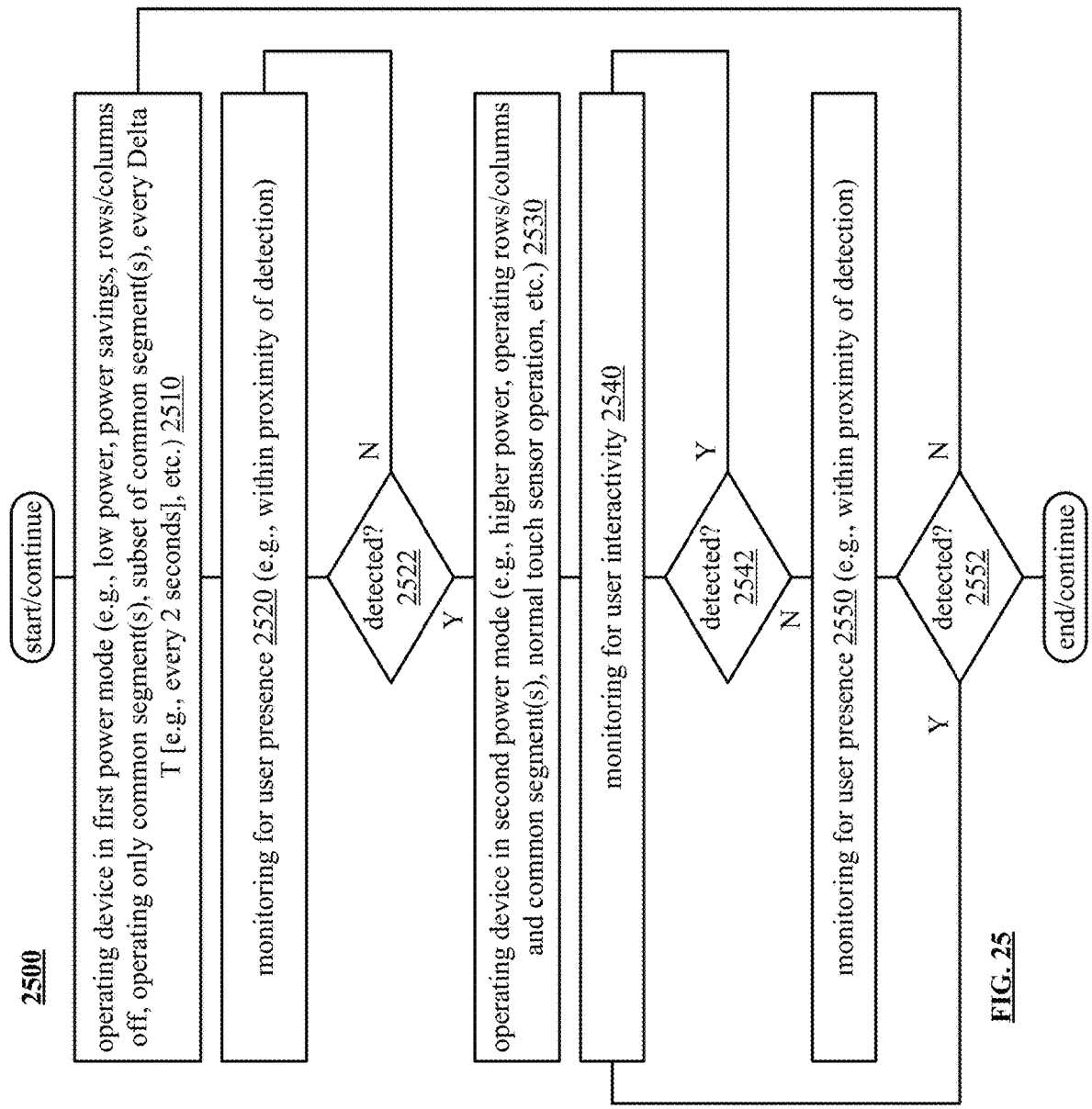
FIG. 25 is a schematic block diagram of another embodiment of a method for execution by one or more devices in accordance with the present invention.

FIG. 25 is a schematic block diagram of another embodiment of a method 2500 for execution by one or more devices in accordance with the present invention. The method 2500 operates in step 2510 by operating a device in a first mode. Note that the first mode may be a low-power mode, power savings mode, a mode in which the rows and columns of a touch sensor system are off, a mode in which only the one or more common segments of the device are operable, and mode in which one or more subsets of common segments are operable, a mode that is only operable intermittently such every certain period of time (e.g., every 1, 2, 3, or 5 seconds), etc.

The method 2500 operates in step 2520 by monitoring for user presence. This may be performed by performing proximity detection, and monitoring for whether or not a user is within sufficient proximity to be detected by the device. Based on user not being detected, such as when one or more of the signals associated with the one or more common segments compares unfavorably to a detection parameter (e.g., a detection signal being below a certain threshold), then the method 2500 branches via step 2422 back to the step 2520.

Alternatively, based on a user being detected, such as when the one or more of the signals associated with the one or more common segments compares favorably to a detection parameter (e.g., a detection signal being above a certain threshold), then the method 2500 branches via step 2422 to step 2530 by operating the device and a second mode. Note that this second mode may be a high-power mode, a mode in which the rows and columns of the touch sensor system are operational, a mode operable to effectuate normal touch sensor operation, etc.

As can be seen, the method 2500 provides improvement of the operation of the device by performing power savings based on detection of a user within the proximity of the device. When a user is not proximately located to the device, then the touch sensor system functionality may be operated in an alternative power mode (e.g., low power, power savings, off, etc.).

The method 2500 also operates in step 2540 by monitoring for user interactivity with the device. Based on user interactivity with the device being detected, the method 2500 branches via 2542 back to step 2540 and continues monitoring for user interactivity. For example, if the user is interacting with the touch sensor system of the device, then user interactivity is detected. Alternatively, if the user is interacting with a gesture detection system of the device, then user interactivity is detected. In addition, if there are additional buttons such as an external controller, remote control, etc. associated with the device, and if the user is interacting with such components of the device, then user interactivity is detected.

Alternatively, based on user interactivity with the device not being detected, the method 2500 branches via step 2542 to step 2550 and operates by monitoring for user presence. For example, if no user interactivity is detected, then the method 2500 operates by monitoring for user presence in step 2550 to determine whether or not the user is still within proximity of the device. For example, the user may still be present and near the device, but may not be interacting with the device. Based on the user's presence being detected, the method 2500 branches via step 2552 to step 2540 and operates by monitoring for user activity. Alternatively, based on user's presence not being detected, the method 2500 branches via step 2552 to step 2510 and continues by operating in the first mode.

Note that alternative variations may be implemented such that certain systems may be operated within an alternative power mode based on non-use by the user. For example, during time periods when a user is determined to be present, but not interacting with the touch sensor system, then the touch sensor system may be operated within an alternative mode (e.g., low power, power savings, etc.) until interactivity with the touch sensor system is again detected.

This disclosure presents, among other things, various embodiments, examples, etc. of a projected capacitive sensing system that is implemented using more than two sets of conductive elements to form a touch sensor system. In some examples, these sets of conductive elements are formed by patterning a single transparent conductive layer and connecting to the conductive elements using one or more layers of metal lines on layers either above or below the transparent conductive layer (e.g., which may be implemented using Indium tin oxide (ITO)).

The metal lines connecting the transparent conductive segments could be grouped together to create the two or more sets of conductive elements (e.g., certain examples herein include three rows of conductive elements grouped together to form a single touch sensor row). The use of this third set of one or more conductive segments/elements, for example, provide a number of benefits for a pro-cap touch system. Examples of such improvements may include any one or more of a reduction of parasitic capacitance to the rows and columns for an in-cell touch sensor system, use of a set of conductive elements as a proximity detection sensor, and use of a set of conductive elements as a gesture recognition sensor that is separate and distinct from the pro-cap touch system.

In addition, a fourth set of conductors could enable two concurrent X-Y pro-cap sensors in the same layer. The individual conductive elements could also be dynamically grouped together, using off screen switches, that could change according to an operational situation in order to form more specific functions, such as, buttons, sliders, proximity sensor, gesture sensor, custom groupings or shapes, etc.

Moreover, in even other examples, note that the one or more common areas of the conductive material that are not implemented particularly for the one or more touch sensors may be implemented and used for other types of devices. For example, the common/leftover area outside of the one or more touch sensors may be implemented for entirely different applications besides touch, proximity, gesture, etc. In many devices, there is a conductive plate implemented behind the one or more touch sensors. For example, consider an interactive display device that includes both display and touch sensor capability, and consider that the display is implemented using LCD technology. In such examples, there may be a liquid crystal layer implemented between two layers of glass. Also, there is often a metal frame implemented behind the backlight of the device.

The device may be implemented to support force detection based on a change of capacitance between the metal frame and the one or more common areas of the conductive material that are not implemented particularly for the one or more touch sensors. For example, as a user is interacting with the touch screen, perhaps the user is applying such a sufficient force to the touch screen that the capacitance between those one or more common areas of the conductive material that are not implemented particularly for the one or more touch sensors and the metal frame changes sufficiently to be detected. In some examples, based upon such a detection, an error signal may be provided via the display to notify the user to reduce the amount of force being applied to the touch screen or to stop interacting with the touch screen in such a manner.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (e.g., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    one or more conductive layers that is implemented for a touch sensor and a common portion, wherein the touch sensor includes a plurality of segments that are electrically connected;
    a drive-sense circuit (DSC) operably coupled to the touch sensor, wherein, when enabled, the DSC configured to:
        generate a signal based on a reference signal;
        provide the signal to the touch sensor via a single line and simultaneously to sense the signal via the single line, wherein an electrical characteristic of the touch sensor affects the signal; and
        generate a digital signal representative of an effect on the signal based on the electrical characteristic of the touch sensor;
    memory that stores operational instructions; and
    one or more processing modules operably coupled to the DSC and the memory, wherein, when enabled, the one or more processing modules is configured to execute the operational instructions to:
        process the digital signal to determine the electrical characteristic of the touch sensor; and
        process the electrical characteristic of the touch sensor to detect interaction of a user with the touch sensor.

2. The computing device of claim 1, wherein:
    the one or more conductive layers are implemented on a same plane.

3. The computing device of claim 1, wherein:
    the one or more conductive layers are implemented within more than one plane.

4. The computing device of claim 1, wherein:
    the one or more conductive layers that is implemented for the touch sensor and the common portion also is implemented for another touch sensor; and
    the another touch sensor includes another plurality of segments that are electrically connected.

5. The computing device of claim 4, wherein:
    the touch sensor is aligned in a first direction; and
    the another touch sensor is aligned in a second direction that is different than the first direction.

6. The computing device of claim 1, wherein the common portion is implemented for another touch sensor, and further comprising:
    another DSC operably coupled to the another touch sensor, wherein, when enabled, the another DSC configured to:
        generate another signal based on another reference signal;
        provide the another signal to the another touch sensor via another single line and simultaneously to sense the another signal via the another single line, wherein another electrical characteristic of the another touch sensor affects the another signal; and
        generate another digital signal representative of another effect on the signal based on the another electrical characteristic of the another touch sensor;
    wherein, when enabled, the one or more processing modules is configured to execute the operational instructions to:
        process the another digital signal to determine the another electrical characteristic of the another touch sensor; and
        process the another electrical characteristic of the another touch sensor to detect other interaction of the user with the another touch sensor.

7. The computing device of claim 1, wherein the common portion is implemented for another touch sensor, and further comprising:
    another DSC operably coupled to the another touch sensor, wherein, when enabled, the another DSC configured to:
        generate another signal based on another reference signal;
        provide the another signal to the another touch sensor via another single line and simultaneously to sense the another signal via the another single line, wherein another electrical characteristic of the another touch sensor affects the another signal; and
        generate another digital signal representative of another effect on the signal based on the another electrical characteristic of the another touch sensor;
    wherein, when enabled, the one or more processing modules is configured to execute the operational instructions to:
        process the another digital signal to determine the another electrical characteristic of the another touch sensor; and
        process the another electrical characteristic of the another touch sensor to detect presence of the user within a detectable proximity of the computing device.

8. The computing device of claim 7, wherein, when enabled, the one or more processing modules is configured to execute the operational instructions to:
    operate the computing device based on a first power mode before detection of the presence of the user within the detectable proximity of the computing device; and
    operate the computing device based on a second power mode that is different than the first power mode after detection of the presence of the user within the detectable proximity of the computing device.

9. The computing device of claim 8, wherein, when enabled, the one or more processing modules is configured to execute the operational instructions to:
    after detection of the presence of the user within the detectable proximity of the computing device, process the electrical characteristic of the touch sensor to detect other interaction of the user with the touch sensor;

based on no detection of the other interaction of the user with the touch sensor, process the another electrical characteristic of the another touch sensor to detect other presence of the user within the detectable proximity of the computing device; and based on no detection of the other presence of the user within the detectable proximity of the computing device, operate the computing device based on the first power mode.

10. The computing device of claim 8, wherein:

the first power mode is a lower power mode than the second power mode.

11. The computing device of claim 1, wherein:

the common portion is implemented for another touch sensor; and a segment of the plurality of segments is surrounded by a portion of the common portion.

12. The computing device of claim 1, wherein:

the one or more conductive layers that is implemented for the touch sensor and the common portion also is implemented for another touch sensor;

the another touch sensor includes another plurality of segments that are electrically connected;

a segment of the plurality of segments and another segment of the another plurality of segments are adjacently located within an area of the one or more conductive layers; and the segment of the plurality of segments and the another segment of the another plurality of segments are surrounded by a portion of the common portion.

13. The computing device of claim 1, wherein:

the one or more conductive layers that is implemented for the touch sensor and the common portion also is implemented for another touch sensor;

the another touch sensor includes another plurality of segments that are electrically connected;

a segment of the plurality of segments is surrounded by another segment of the another plurality of segments; and the another segment of the another plurality of segments is surrounded by a portion of the common portion.

14. The computing device of claim 1, wherein the touch sensor is implemented within a touchscreen of the computing device.

15. A computing device comprising:

one or more conductive layers that is implemented for a touch sensor and a common portion, wherein the one or more conductive layers are implemented on a same plane, wherein the touch sensor includes a plurality of segments that are electrically connected, wherein the common portion is implemented for another touch sensor;

a drive-sense circuit (DSC) operably coupled to the touch sensor, wherein, when enabled, the DSC configured to:

generate a signal based on a reference signal;

provide the signal to the touch sensor via a single line and simultaneously to sense the signal via the single line, wherein an electrical characteristic of the touch sensor affects the signal; and generate a digital signal representative of an effect on the signal based on the electrical characteristic of the touch sensor;

another DSC operably coupled to the another touch sensor, wherein, when enabled, the another DSC configured to:

generate another signal based on another reference signal;

provide the another signal to the another touch sensor via another single line and simultaneously to sense the another signal via the another single line, wherein another electrical characteristic of the another touch sensor affects the another signal; and generate another digital signal representative of another effect on the signal based on the another electrical characteristic of the another touch sensor;

memory that stores operational instructions; and one or more processing modules operably coupled to the DSC and the memory, wherein, when enabled, the one or more processing modules is configured to execute the operational instructions to:

process the digital signal to determine the electrical characteristic of the touch sensor;

process the electrical characteristic of the touch sensor to detect interaction of a user with the touch sensor;

process the another digital signal to determine the another electrical characteristic of the another touch sensor; and process the another electrical characteristic of the another touch sensor to detect presence of the user within a detectable proximity of the computing device.

16. The computing device of claim 15, wherein, when enabled, the one or more processing modules is configured to execute the operational instructions to:

operate the computing device based on a first power mode before detection of the presence of the user within the detectable proximity of the computing device; and operate the computing device based on a second power mode that is different than the first power mode after detection of the presence of the user within the detectable proximity of the computing device.

17. The computing device of claim 15, wherein:

a segment of the plurality of segments is surrounded by a portion of the common portion.

18. The computing device of claim 15, wherein the touch sensor and the another touch sensor are implemented within a touchscreen of the computing device.

19. The computing device of claim 15, wherein:

the one or more conductive layers that is implemented for the touch sensor and the common portion also is implemented for another touch sensor; and the another touch sensor includes another plurality of segments that are electrically connected.

20. The computing device of claim 19, wherein:

the touch sensor is aligned in a first direction; and the another touch sensor is aligned in a second direction that is different than the first direction.

* * * * *